US012792706B2

(12) United States Patent
Chan et al.

(10) Patent No.: US 12,792,706 B2
(45) Date of Patent: *Nov. 10, 2026

(54) DEVICES, METHODS, AND NON-TRANSITORY COMPUTER-READABLE MEDIA FOR EXPERIMENTAL BEHAVIORAL DATA CAPTURE PLATFORM

(71) Applicant: MASTERCARD TECHNOLOGIES CANADA ULC, Vancouver (CA)

(72) Inventors: Sik Suen Chan, Richmond (CA); Perry McGee, Vancouver (CA); Cristian Frentiu, Port Coquitlam (CA)

(73) Assignee: MASTERCARD TECHNOLOGIES CANADA ULC, Vancouver (CA)

( * ) Notice: Subject to any disclaimer, the term of this patent is extended or adjusted under 35 U.S.C. 154(b) by 97 days.

This patent is subject to a terminal disclaimer.

(21) Appl. No.: 18/598,366

(22) Filed: Mar. 7, 2024

(65) Prior Publication Data

US 2024/0303305 A1 Sep. 12, 2024

Related U.S. Application Data

(60) Provisional application No. 63/489,000, filed on Mar. 8, 2023.

(51) Int. Cl.
*G06F 21/31* (2013.01)

(52) U.S. Cl.
CPC .... *G06F 21/316* (2013.01); *G06F 2221/2137* (2013.01); *G06F 2221/2151* (2013.01)

(58) Field of Classification Search
CPC ........... G06F 21/316; G06F 2221/2137; G06F 2221/2151
See application file for complete search history.

(56) References Cited

U.S. PATENT DOCUMENTS 10,108,791 B1 * 10/2018 Masterman ........... G06F 21/316
12,306,916 B2 * 5/2025 Garriga Calleja .... G06F 21/316
(Continued)

FOREIGN PATENT DOCUMENTS

WO 2022036007 A1 2/2022

OTHER PUBLICATIONS

Chai, C., et al. "Data management for machine learning: A survey." IEEE Transactions on Knowledge and Data Engineering 35.5 (2022): 4646-4667.

(Continued)

*Primary Examiner* — Mohammad W Reza
(74) *Attorney, Agent, or Firm* — Michael Best & Friedrich LLP

(57) ABSTRACT

Devices, non-transitory computer-readable media, and systems. In one example, a computing device may include a memory and an electronic processor configured to: receive information of a user of the computing device, perform authentication of the user based on the information of the user, determine a list of behavioral experiments that can be performed by the user based on the authentication of the user and the information of the user, the list of behavioral experiments including one or more behavioral experiments, display the list of behavioral experiments, receive a selection of a behavioral experiment in the list of behavioral experiments from the user, initiate the behavioral experiment based on the selection, and in response to the user completing the behavioral experiment, upload experiment data to a server.

20 Claims, 37 Drawing Sheets

(56) References Cited

U.S. PATENT DOCUMENTS

| | | | | |
|---|---|---|---|---|
| 2020/0410056 | A1 | 12/2020 | Chen et al. | |
| 2021/0264005 | A1* | 8/2021 | Toth | H04L 63/1425 |
| 2021/0307663 | A1* | 10/2021 | Junquera | G09B 5/06 |
| 2022/0407598 | A1 | 12/2022 | Graham et al. | |

OTHER PUBLICATIONS

Cheng, P., et al. "Frog: A fast and reliable crowdsourcing framework." IEEE Transactions on Knowledge and Data Engineering 31.5 (2018): 894-908.

Gureckis, T.M. et al. "psiTurk: An open-source framework for conducting replicable behavioral experiments online." Behavior research methods 48 (2016): 829-842.

International Search Report and Written Opinion for Application No. PCT/CA2024/050277 dated May 21, 2024 (11 pages).

Li, G., et al. "Crowdsourced data management: A survey." IEEE Transactions on Knowledge and Data Engineering 28.9 (2016): 2296-2319.

Litman, L. et al.. "TurkPrime. com: A versatile crowdsourcing data acquisition platform for the behavioral sciences." Behavior research methods 49.2 (2017): 433-442.

Liu, Y., et al. "CrowdOS: A ubiquitous operating system for crowdsourcing and mobile crowd sensing." IEEE Transactions on Mobile Computing 21.3 (2020): 878-894.

Lopez, M., et al. Jul. 2010. Peoplecloud service for enterprise crowdsourcing. In 2010 IEEE international conference on services computing (pp. 538-545). IEEE.

Roh, Y. et al. "A survey on data collection for machine learning: a big data-ai integration perspective." IEEE Transactions on Knowledge and Data Engineering 33.4 (2019): 1328-1347.

Soprano, M., et al. "Crowd_Frame: a simple and complete framework to deploy complex crowdsourcing tasks off-the-shelf." Proceedings of the Fifteenth ACM International Conference on Web Search and Data Mining (WSDM'22), Feb. 21-25, 2022, Tempe, AZ, USA, pp. 1605-1608, Feb. 21, 2022 (Feb. 21, 2022).

Xia, H., et al. (2019). Trace: A stigmergic crowdsourcing platform for intelligence analysis. In 52nd Annual Hawaii International Conference on System Sciences, HICSS 2019 (pp. 440-448). IEEE Computer Society.

* cited by examiner

DEVICES, METHODS, AND NON-TRANSITORY COMPUTER-READABLE MEDIA FOR EXPERIMENTAL BEHAVIORAL DATA CAPTURE PLATFORM

CROSS-REFERENCE TO RELATED APPLICATION

This application claims priority to, and the benefit of, U.S. Provisional Application No. 63/489,000, filed on Mar. 8, 2023, the contents of which are incorporated by reference herein.

FIELD OF THE INVENTION

The present disclosure relates generally to capturing behavioral inputs. More specifically, the present disclosure relates to devices, non-transitory computer-readable media, and systems for experimental behavioral data capture platform.

BACKGROUND

Users may intentionally perform various tasks on a mobile or desktop application that provides specific training data to assist machine learning in developing behavioral detection models. The mobile or desktop application provides a specific experiment that captures the inputs from each of the users. The mobile or desktop application then transmits the captured inputs (or behavioral data if the captured inputs are pre-processed) to a server for inclusion in training data that may be used by machine learning to generate or update a behavioral detection model. However, the behavioral experiment provided by the mobile or desktop application is static and requires a large re-write (or complete re-write) of the mobile or desktop application in order to conduct a second experiment that captures the inputs from the same or different users. The large re-write of the mobile or desktop application requires a significant amount of time and results in a loss of inputs relative to other experiments during the time of the re-write.

SUMMARY

To solve the “static” nature of the mobile or desktop application and the loss of inputs relative to other behavioral experiments during the time of the re-write, an experimental behavioral data capture platform is provided herein. The experimental behavioral data capture platform is a platform that allows a user to perform one or more behavioral experiments and a behavioral data consumer to rapidly receive and aggregate behavioral data across the one or more behavioral experiments.

The experimental behavioral data capture platform is also a platform that allows a developer to flexibly update behavioral experiments without a complete redesign of an experiment. In particular, the experimental behavioral data capture platform allows a developer to adjust existing experiments to target distinct types of data over the course of the experiment. The developer may adjust an existing experiment in two ways: 1) adjusting a configuration file and 2) adjusting UI elements. Adjustments to the configuration file adjusts what data is collected and adjustments to the UI elements adjusts the structure on which the data is collected.

Lastly, the experimental behavioral data capture platform may restrict users from repeating experiments. By limiting users to a certain number of experiment sessions per day, the experimental behavioral data capture platform may reduce fatigue and maintain the consistency of the behavioral data being captured.

In some aspects, the techniques described herein relate to a computing device including: a memory; and an electronic processor configured to: receive information of a user of the computing device, perform authentication of the user based on the information of the user, determine a list of behavioral experiments that can be performed by the user based on the authentication of the user and the information of the user, the list of behavioral experiments including one or more behavioral experiments, display the list of behavioral experiments, receive a selection of a behavioral experiment in the list of behavioral experiments from the user, initiate the behavioral experiment based on the selection, and in response to the user completing the behavioral experiment, upload experiment data to a server.

In some aspects, the techniques described herein relate to a non-transitory computer-readable medium including instructions that, when executed by an electronic processor, cause the electronic processor to perform a set of operations including: receiving information of a user; performing authentication of the user based on the information of the user; determining a list of behavioral experiments that can be performed by the user based on the authentication of the user and the information of the user, the list of behavioral experiments including one or more behavioral experiments; controlling a display to display the list of behavioral experiments; receiving a selection of a behavioral experiment in the list of behavioral experiments from the user; initiating the behavioral experiment based on the selection; and in response to the user completing the behavioral experiment, uploading experiment data to a server.

In some aspects, the techniques described herein relate to a system including: a computing device; and a server including a memory and an electronic processor, the memory including a list of behavioral experiments, and the electronic processor is configured to: receive information of a user of the computing device, perform authentication of the user based on the information of the user, receive a request for access to a portion of the list of behavioral experiments that can be performed by the user based on the authentication of the user and the information of the user, the portion of the list of behavioral experiments including one or more behavioral experiments, output the portion of the list of behavioral experiments to the computing device, receive experiment data from the computing device, the experiment data including a collected behavioral data payload, and the experiment data indicating an association with a behavioral experiment from the portion of the list of behavioral experiments, store the experiment data in the memory, and associate the experiment data with the behavioral experiment from the list of behavioral experiments.

Other aspects of the embodiments will become apparent by consideration of the detailed description and accompanying drawings.

DETAILED DESCRIPTION OF THE EMBODIMENTS

Figure 1:
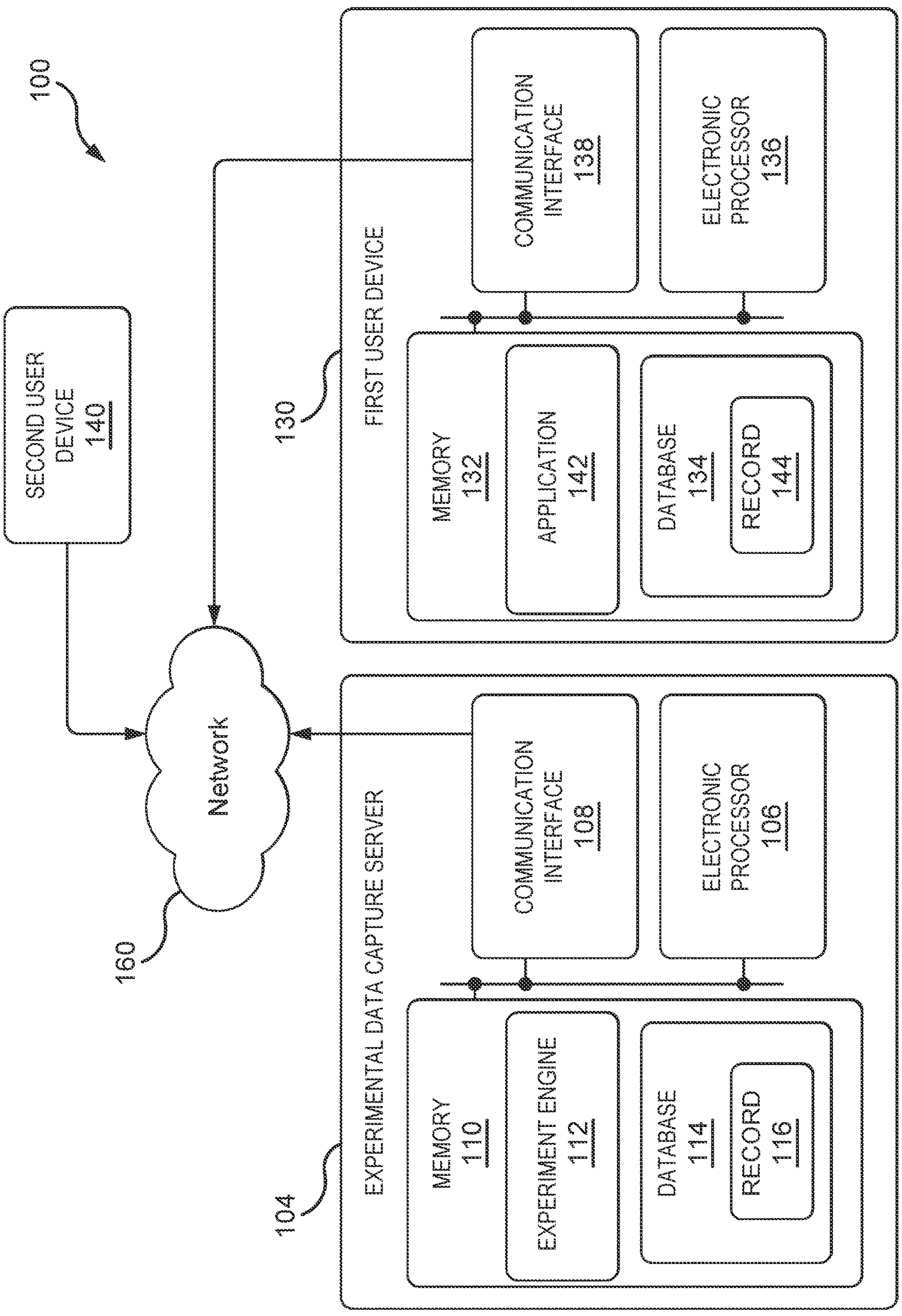
FIG. 1 is a block diagram illustrating an example system for an experimental behavioral data capture platform, in accordance with various aspects of the present disclosure.

FIG. 1 is a block diagram illustrating an example system 100 for an experimental behavioral data capture platform, in accordance with various aspects of the present disclosure. In the example of FIG. 1, the system 100 includes a behavioral experimental data capture server 104, a first user device 130, a second user device 140, and a network 160.

The behavioral experimental data capture server 104 may be owned by, or operated by or on behalf of, an administrator. The behavioral experimental data capture server 104 includes an electronic processor 106, a communication interface 108, and a memory 110. The electronic processor 106 is communicatively coupled to the communication interface 108 and the memory 110. The electronic processor 106 is a microprocessor or another suitable processing device. The communication interface 108 may be implemented as one or both of a wired network interface and a wireless network interface. The memory 110 is one or more of volatile memory (e.g., RAM) and non-volatile memory (e.g., ROM, FLASH, magnetic media, optical media, et cetera). In some examples, the memory 110 is also a non-transitory computer-readable medium. Although shown within the behavioral experimental data capture server 104, memory 110 may be, at least in part, implemented as network storage that is external to the behavioral experimental data capture server 104 and accessed via the communication interface 108. For example, all or part of memory 110 may be housed on the "cloud."

The behavioral experiment engine 112 may be stored within a transitory or non-transitory portion of the memory 110. The behavioral experiment engine 112 includes machine readable instructions that are executed by the electronic processor 106 to perform the functionality of the behavioral experimental data capture server 104 (also referred to as an "API server" herein) as described below with respect to FIGS. 2A-9B.

The memory 110 may include a database 114 for storing information about individuals. The database 114 may be an RDF database, i.e., employ the Resource Description Framework. Alternatively, the database 114 may be another suitable database with features similar to the features of the Resource Description Framework, and various non-SQL databases, knowledge graphs, etc. The database 114 may include a plurality of records. Each record may be associated with and contain behavioral captures of one individual. For example, in the illustrated embodiment, record 116 may be associated with the individual associated with the first user device 130, and other N records may be respectively associated with one of N other individuals (not expressly shown in FIG. 1).

The first user device 130 may be web-compatible mobile computer, such as a laptop, a tablet, a smart phone, or other suitable computing device. Alternately, or in addition, the first user device 130 may be a desktop computer. The first user device 130 includes an electronic processor 136, a communication interface 138, and a memory 132. The electronic processor 136 is communicatively coupled to the communication interface 138 and the memory 132. The electronic processor 136 is a microprocessor or another suitable processing device. The communication interface 138 may be implemented as one or both of a wired network interface and a wireless network interface. The memory 132 is one or more of volatile memory (e.g., RAM) and non-volatile memory (e.g., ROM, FLASH, magnetic media, optical media, et cetera). In some examples, the memory 132 is also a non-transitory computer-readable medium.

The memory 132 includes an application 142. The application 142, which contains software instructions implemented by the electronic processor 136 of the first user device 130 to perform the functions of the first user device 130 as described herein, is stored within a transitory or a non-transitory portion of the memory 132. The application 142 may have a graphical user interface that facilitates interaction between a first individual (also referred to as a "user" or "experimental data platform user" herein) and the first user device 130. The application 142 may be a standalone mobile application or a web browser accessing a web application.

The application 142 may be stored within a transitory or non-transitory portion of the memory 132. The application 142 includes machine readable instructions that are executed by the electronic processor 136 to perform the functionality of the application 142 (also referred to as a "web application" or "mobile application" herein) as described below with respect to FIGS. 2A-9B.

The first user device 130 may communicate with the behavioral experimental data capture server 104 over the network 160. The network 160 is preferably (but not necessarily) a wireless network, such as a wireless personal area network, local area network, or other suitable network. In some examples, the second user device 140 may directly communicate with the behavioral experimental data capture server 104. In other examples, the second user device 140 may indirectly communicate over network 160.

In an embodiment, the memory of the first user device 130 may include a database and software. The database of the first user device 130 may include information about a behavioral capture of a first individual, as set forth herein. The software of the first user device 130 may facilitate interaction between the first user device 130 and the behavioral experimental data capture server 104 to perform the operations as described in greater detail below.

The second user device 140 may be web-compatible mobile computer, such as a laptop, a tablet, a smart phone, or other suitable computing device. Alternately, or in addition, the second user device 140 may be a desktop computer. The second user device 140 includes an electronic processor in communication with memory. The electronic processor is a microprocessor or another suitable processing device, the memory is one or more of volatile memory and non-volatile memory, and the communication interface may be a wireless or wired network interface.

An application, which contains software instructions implemented by the electronic processor of the second user device 140 to perform the functions of the second user device 140 as described herein, is stored within a transitory or a non-transitory portion of the memory. The application may have a graphical user interface that facilitates interaction between a second individual and the second user device 140, the second individual being different from the first individual. The application may be a standalone mobile application or a web browser accessing a web application.

The second user device 140 may communicate with the behavioral experimental data capture server 104 over the Internet via the network 160. The network 160 is preferably (but not necessarily) a wireless network, such as a wireless personal area network, local area network, a wired network, a cellular network (e.g., a global system for mobile communications (GSM) network, a code division multiple access (CDMA) network), other suitable network, or a combination thereof. In some examples, the second user device 140 may directly communicate with the behavioral experimental data capture server 104. In other examples, the second user device 140 may indirectly communicate over network 160.

In an embodiment, the memory of the second user device 140 may include a database and software. The database of the second user device 140 may include information about a behavioral capture of a first individual, as set forth herein. The software of the second user device 140 may facilitate interaction between the second user device 140 and the behavioral experimental data capture server 104 to perform the operations as described in greater detail below.

The behavioral experimental data capture server 104 may likewise communicate with devices other than the first user device 130 and the second user device 140. The term "individual," as used herein, encompasses a person (or other entity) that seeks to interact with the behavioral experimental data capture server 104. The workings of the behavioral experimental data capture server 104, the first user device 130, and the second user device 140 will now be described in additional detail with respect to FIGS. 2A-9B.

Figure 2A:
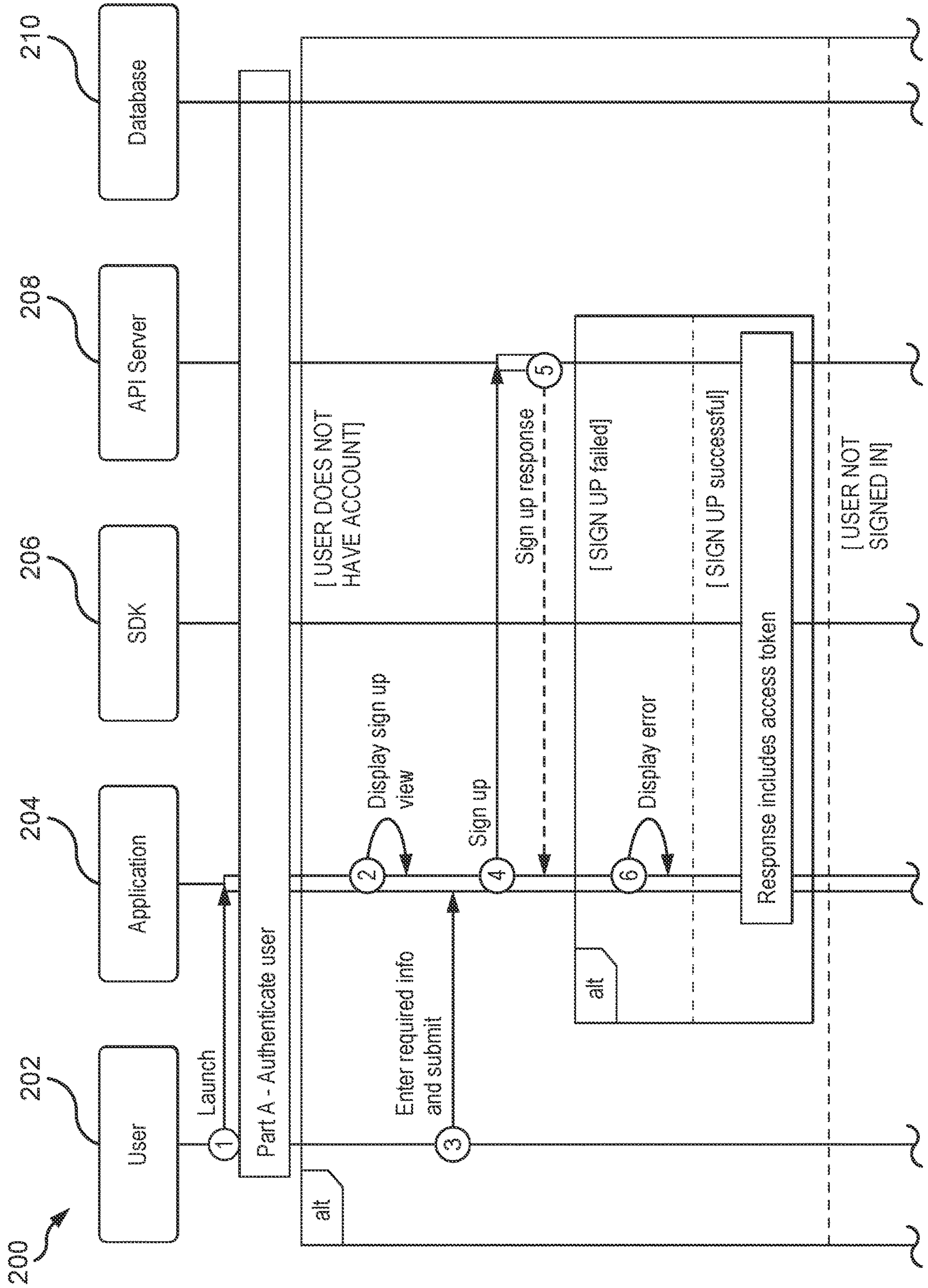
FIGS. 2A-2C are flow diagrams illustrating interactions between a user, the mobile or web application, the software development kit (SDK), the application programming interface (API) server, and a database, in accordance with various aspects of the present disclosure.
Figure 2A:
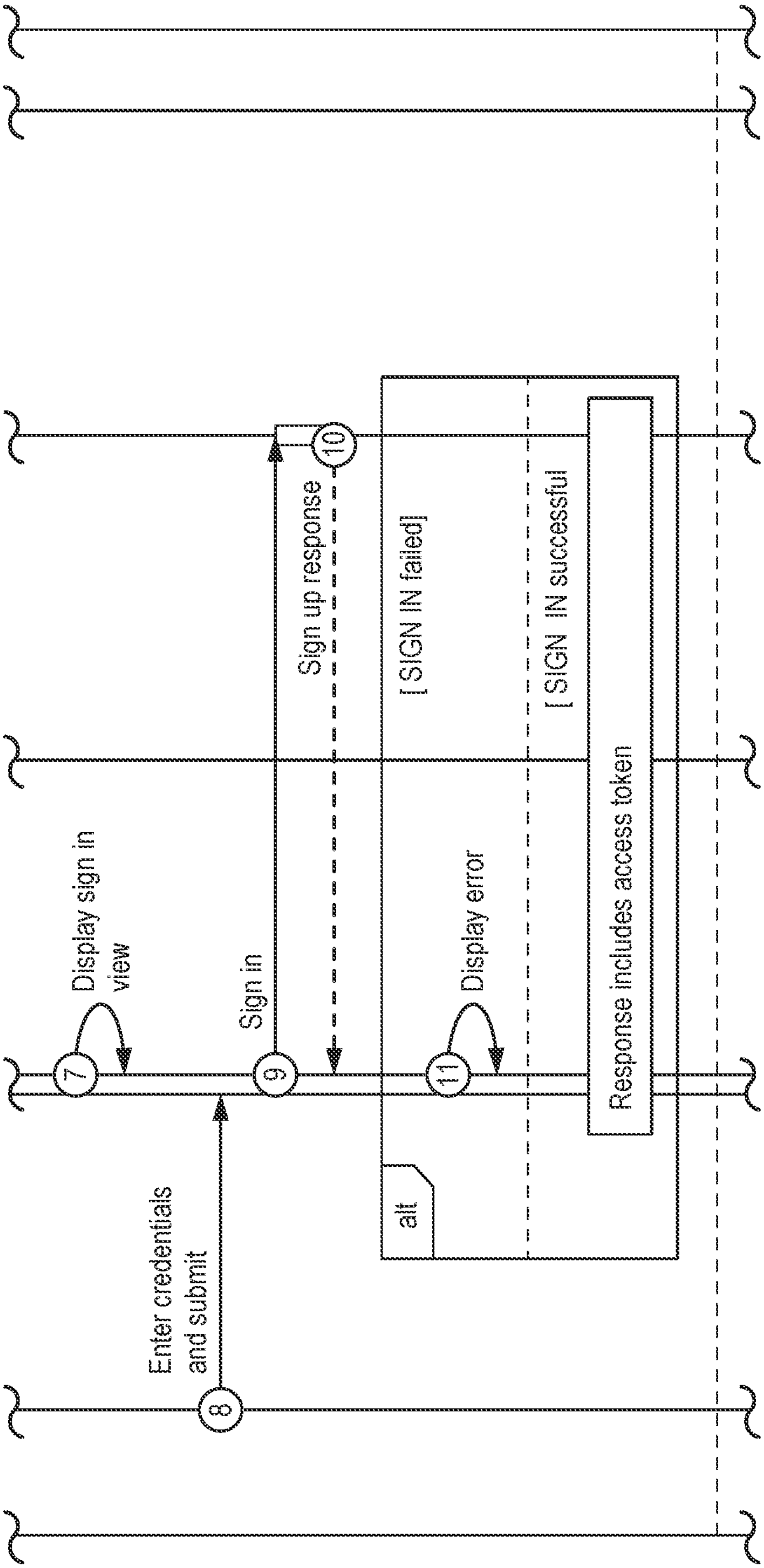
Figure 2A:
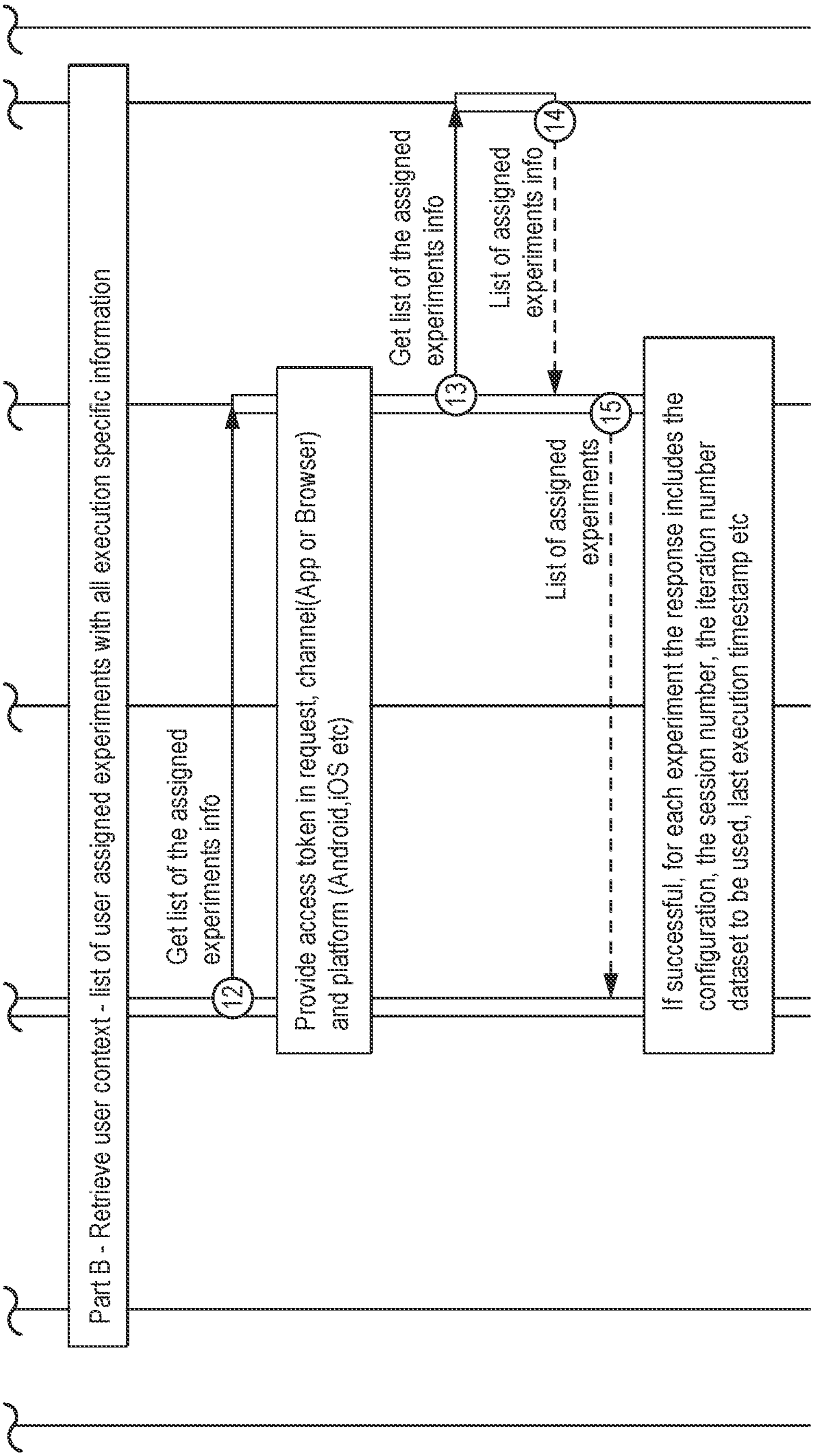
Figure 2B:
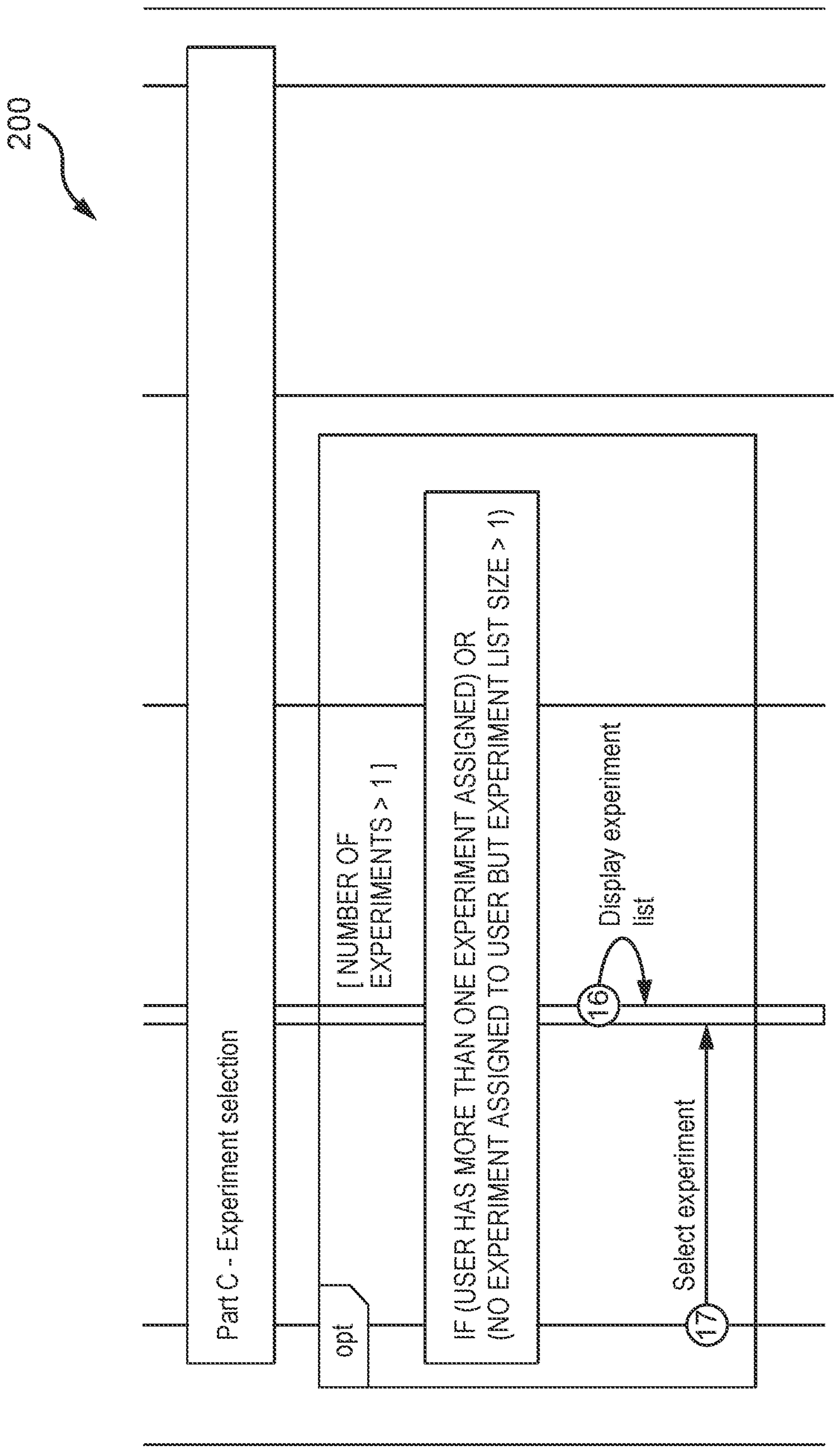
Figure 2C:
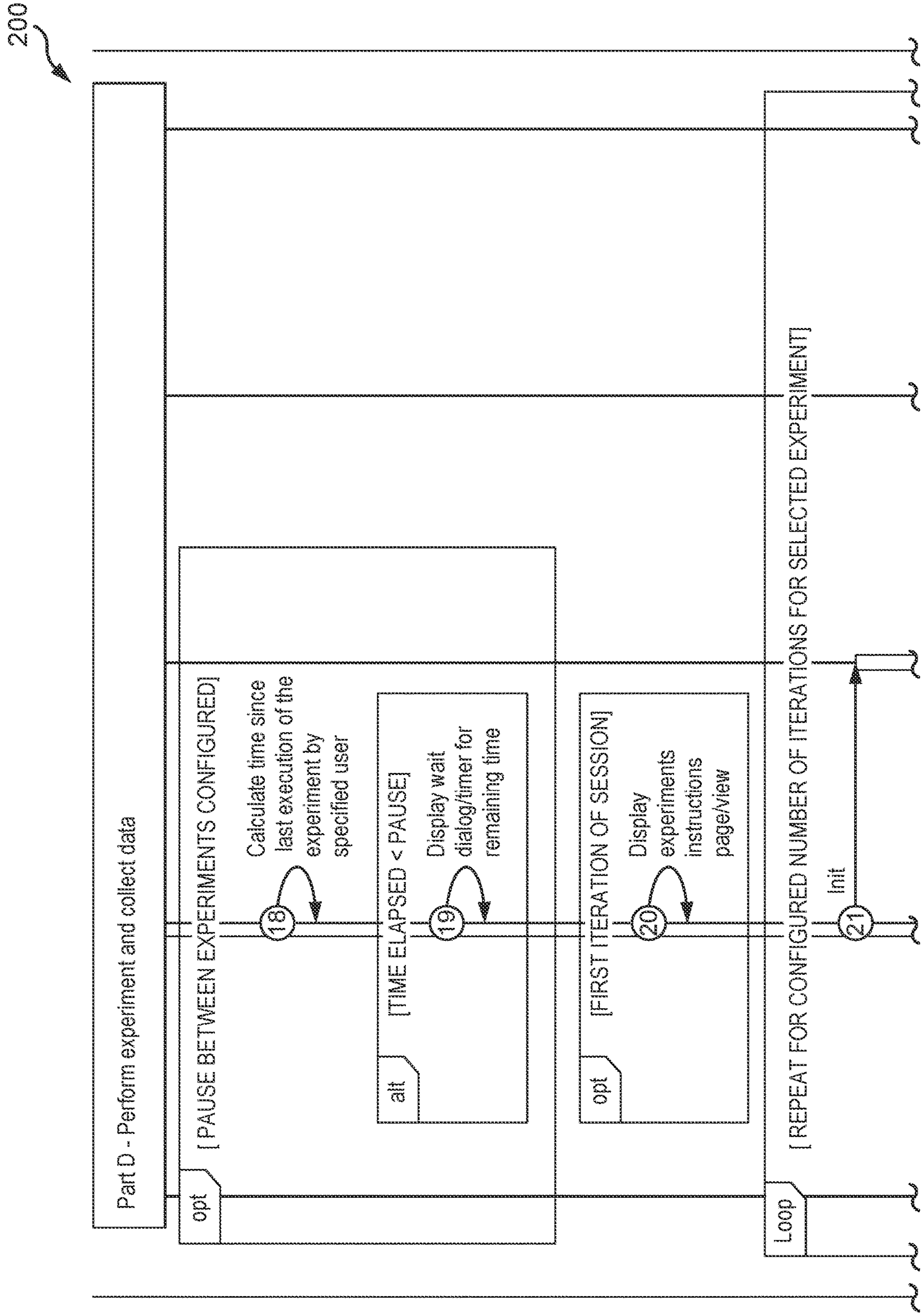
Figure 2C:
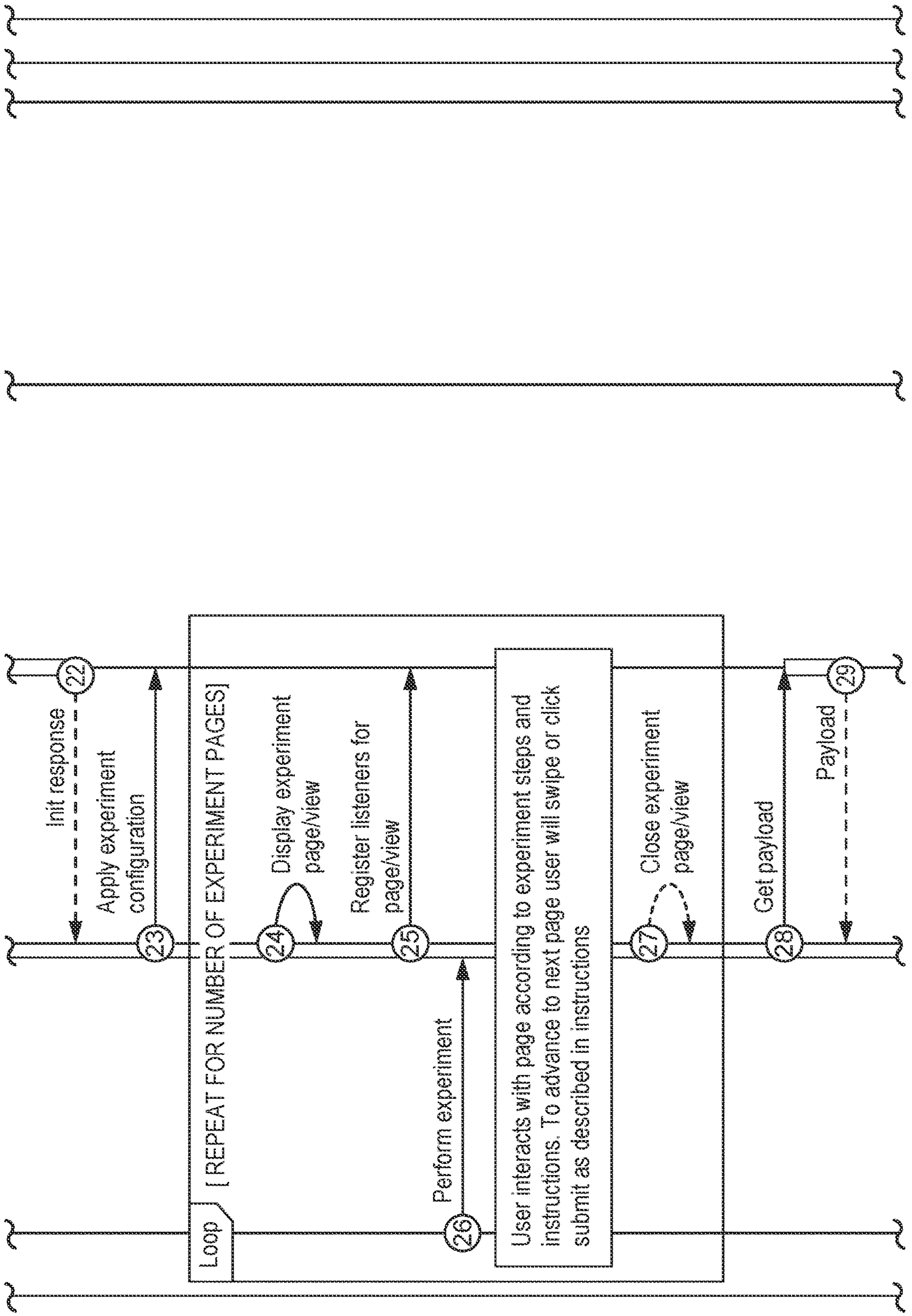
Figure 2C:
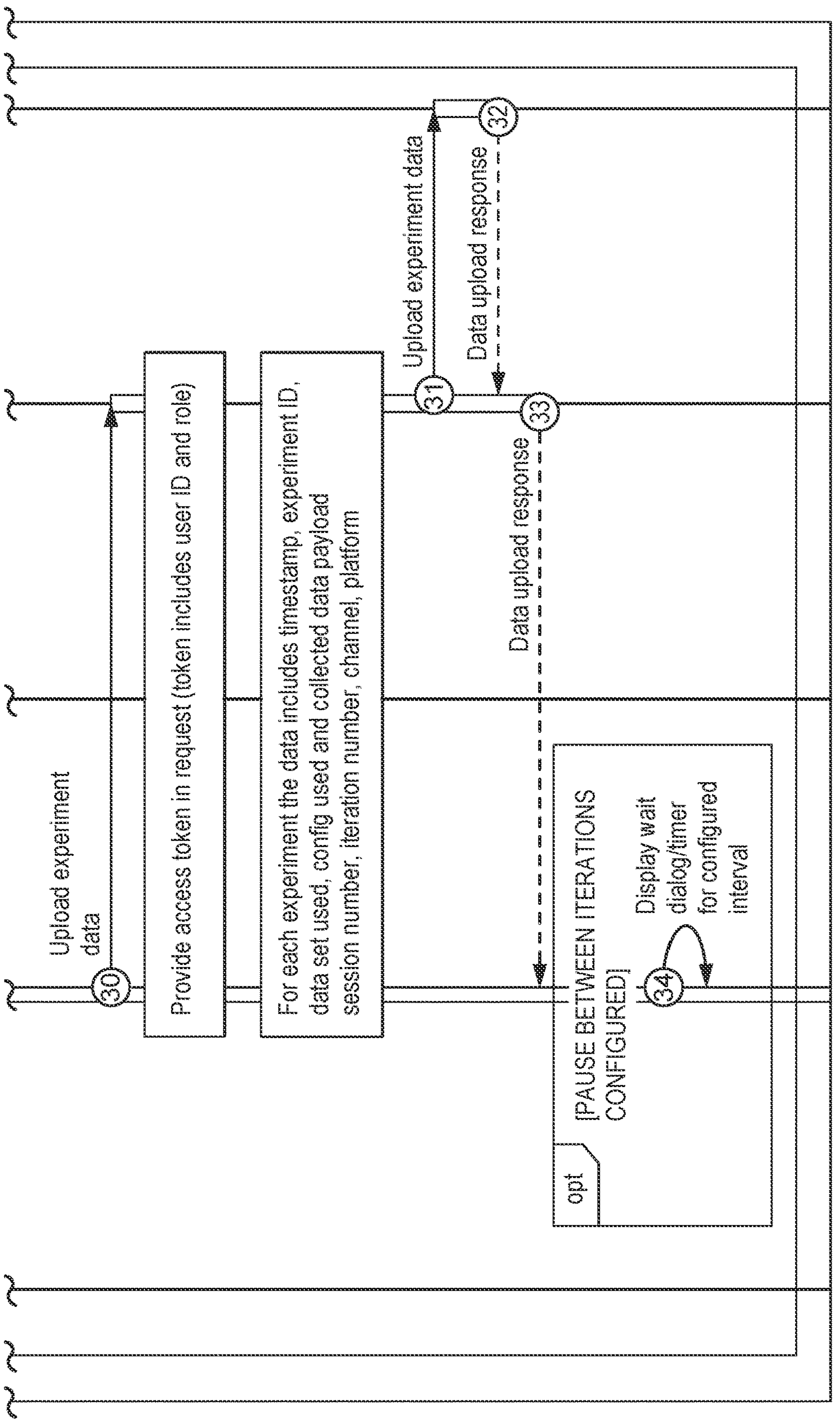

FIGS. 2A-2C are flow diagrams illustrating interactions 200 between a user 202, the mobile or web application 204, the software development kit (SDK) 206, the application programming interface (API) server 208, and a database 210, in accordance with various aspects of the present disclosure. FIGS. 2A-2C are described with respect to FIG. 1. For example, a user 202, the mobile or web application 204, the software development kit (SDK) 206, the application programming interface (API) server 208, and a database 210 correspond to the first individual, the first user device 130, the software of the first user device 130, the behavioral experimental data capture server 104, and the database 114, respectively.

In the example of FIG. 2A, to retrieve available behavioral experiments and the corresponding configurations, the user 202 launches the application 204 (at operation 1). When the user 202 does not have an existing account, the application 204 displays a sign up view to the user 202 (at operation 2). The user 202 enters required information and submits the information at the sign up view (at operation 3). The application 204 takes the submitted information from the user 202 and transmits the submitted information to the API server 208 as a "sign up" (at operation 4). The API server 208 acknowledges the "sign up" with a sign up response to the application 204 (at operation 5). When the application 204 detects an error in the submitted information or in the sign up response, the application 204 displays an error (at operation 6). When the application 204 detects a successful sign up, the application 204 indicates a successful sign up.

When the user 202 has an existing account, the application 204 displays a sign in view to the user 202 (at operation 7). The user 202 enters required information and submits the information at the sign in view (at operation 8). The application 204 takes the submitted information from the user 202 and transmits the submitted information to the API server 208 as a "sign in" (at operation 9). The API server 208 acknowledges the "sign in" with a sign in response to the application 204 (at operation 10). In some embodiments, when the application 204 detects an error in the submitted information or in the sign in response, the application 204 displays an error (at operation 11). In some embodiments, when the application 204 detects a successful sign up, the application 204 indicates a successful sign in or proceeds directly to retrieving user context.

In retrieving user context, the application 204 requests a list of the assigned behavioral experiments from the API server 208 (at operation 12). The API server 208 requests a list of the assigned behavioral experiments from the database 210 (at operation 13) and receives the list of the available behavioral experiments from the database 210 after the sending the request (at operation 14). Upon receiving the list of available behavioral experiments from the database 210, the API server 208 sends the list of available behavioral experiments to the application 204 (at operation 15). In some examples, the list of behavioral experiments may include an experiment differentiating between the same user or not returning to a form/flow using only behavioral data. Additionally, in some examples, the list of behavioral experiments may include an experiment classifying groups of users based on behavior categories.

For each experiment, the response includes a configuration (also referred to as a "configuration file"), the session number, the iteration number, dataset to be used, last execution timestamp, and any other experiment information. The configuration file of each experiment includes some or all of the following: 1) a behavioral experiment name, 2) experiment description, 3) experiment version, 4) experiment number of sessions, 5) experiment session interval, 6) experiment iterations per session, 7) experiment iteration interval, 8) experiment familiar dataset iterations per session, 9) datasets, 10) payload and/or other suitable configuration data.

The behavioral experiment name is the name of the experiment. The experiment description is a high-level description of the experiment and the steps the user has to perform in the form of array of sentences. The experiment version is the version of the experiment. The experiment number of sessions is a number of sessions required to complete the experiment. The experiment session interval is the pause between two consecutive experiment sessions, in minutes (although other time periods may be used). The experiment iterations per session is the number of iterations in an experiment session. The experiment iteration interval is the maximum number of days in which (all required sessions of) the experiment must be completed. The experiment familiar dataset iterations per session is a number of iterations in a session for which the familiar data set should be used. The datasets is an array of data sets to be used in the experiment in the form of array of pages, where each page includes identifier of page fields to be displayed. Each field includes an identifier of the field, name to be displayed, value to be displayed and subfields where needed. The identifiers for pages, fields, and subfields should be used as elementID attribute in the captured payload dynamic event attribute. The payload is an array of attributes to be collected in the payload, per environment/channel. Channel meaning mobile application or browser. The naming of attributes and event types follow existing convention. For sensor event types, sample frequency can be specified as described below (linear accelerometer events to be collected every 100 ms): {"lac": 100}.

In the example of FIG. 2B, once the application 204 indicates the successful sign in, the application 204 determines whether the user 202 has more than one assigned experiment or no experiment assigned to the user 202 and the list of available behavioral experiments is greater than one, the application 204 displays a list of behavioral experiments assigned or available to the user 202 (at operation 16). The user 202 selects a behavioral experiment from the list of behavioral experiments assigned or available to the user 202 (at operation 17).

In the example of FIG. 2C, the application 204 calculates an amount of time since the last execution of a behavioral experiment by the user 202 (at operation 18). In these embodiments, the application 204 determines whether the amount of time is less than a required pause between two different sessions of the same behavioral experiment and displays a wait dialog or timer with remaining time in response to determining that the amount of time is less than the required pause (at operation 19).

Once a behavioral experiment is launched or selected from the list of available behavioral experiments, the application 204 displays an experiments instructions page/view (at operation 20) and initializes the behavioral experiment with the SDK 206 (at operation 21). The SDK 206 provides an initialization response back to the application 204 (at operation 22). The application 204 applies a behavioral experiment configuration to the SDK 206 (at operation 23).

After applying the behavioral experiment configuration to the SDK 206, the application 204 displays a behavioral experiment page or experiment view (at operation 24). Upon displaying the behavioral experiment page or experiment view, the application 204 registers listeners (i.e., user input tracking) for the behavioral experiment page or experiment view with the SDK 206 (at operation 25).

The user 202 performs the behavioral experiment (at operation 26). Specifically, the user 202 interacts with the behavioral experiment page according to experiment steps and instructions on the behavioral experiment page. To advance to the next page (e.g., the next experiment page), the user 202 swipes or clicks submit as described in the instructions on the behavioral experiment page. After the user 202 performs the behavioral experiment and advances to the next page, the application 204 closes the behavioral experiment page or experiment view (at operation 27).

After closing the behavioral experiment page or experiment view, the application 204 requests payload data indicating the captured inputs of the user 202 from the registered listeners (at operation 28). In response to the payload request, the SDK 206 provides the application 204 with the payload data (at operation 29). The application 204 uploads experiment data including some or all of the payload data to the API server 208 (at operation 30). In addition to some or all of the payload data, the behavioral experiment data may include a timestamp, a behavioral experiment ID, a data set used, a configuration used, a collected data payload session number, a page number, an iteration number, a channel (e.g., application or browser), and a platform (e.g., android, IOS, Windows, Mac, or other software platform). The timestamp may include both a start time (when page is displayed and collection of data starts) and an end time (after user fills in entire page, when page is closed and collection of data stops).

In response to receiving the behavioral experiment data, the API server 208 uploads the behavioral experiment data to the database 210 (at operation 31). The database 210 provides a data upload response to the API server 208 (at operation 32). The API server 208 forwards the data upload response to the application 204 (at operation 33). In some embodiments, in response to receiving the data upload response, the application 204 displays an amount of time until the next experiment is accessible (at operation 34). In these embodiments, the application 204 determines whether the amount of time is less than a required pause between two different sessions of the same behavioral experiment and displays a wait dialog or timer with remaining time in response to determining that the amount of time is less than the required pause.

Although the present disclosure is described from the perspective of behavioral experiments, other non-behavioral experiments may also be performed as part of the interactions 200 and by the user 202 in place of, or in addition to, the behavioral experiments described above. In some examples, the list of behavioral experiments may include an experiment differentiating between the same user or not returning to a form/flow using non-behavioral data. Additionally, in some examples, the list of behavioral experiments may include an experiment classifying groups of users based on non-behavior categories.

Figure 3:
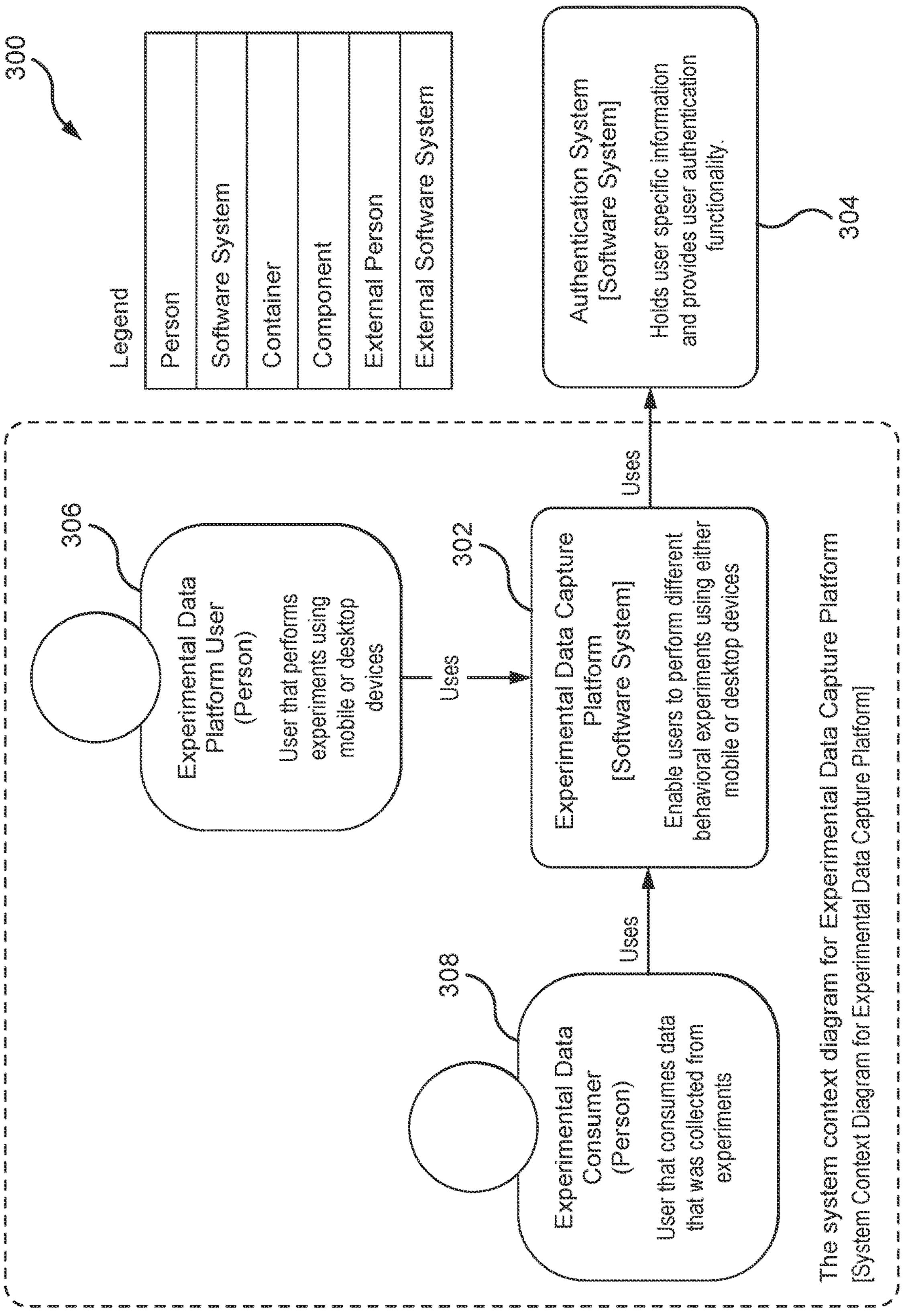
FIG. 3 is a block diagram illustrating an example system context for the experimental behavioral data capture platform of FIG. 1, in accordance with various aspects of the present disclosure.

FIG. 3 is a block diagram illustrating an example system context 300 for the experimental behavioral data capture platform of FIG. 1, in accordance with various aspects of the present disclosure. In the example of FIG. 3, the example system context 300 includes the experimental behavioral data capture platform 302, an authentication system 304, a behavioral experimental data platform user 306, and a behavioral experimental data consumer 308.

The experimental behavioral data capture platform 302 is a platform that runs different behavioral experiments using either mobile or desktop devices. The authentication system 304 is a system that holds user specific information and provides user authentication functionality. The behavioral experimental data platform user 306 is a user that performs behavioral experiments using the mobile or desktop devices. The behavioral experimental data consumer 308 is an individual or entity that designs behavioral experiments and uses the experimental behavioral data capture platform 302 to run the behavioral experiments with users of the experimental behavioral data capture platform 302. The behavioral experimental data consumer 308 also uses the behavioral experimental data platform user 306 to access collected data in order to perform research and development as well as data inspection and processing.

Figure 4:
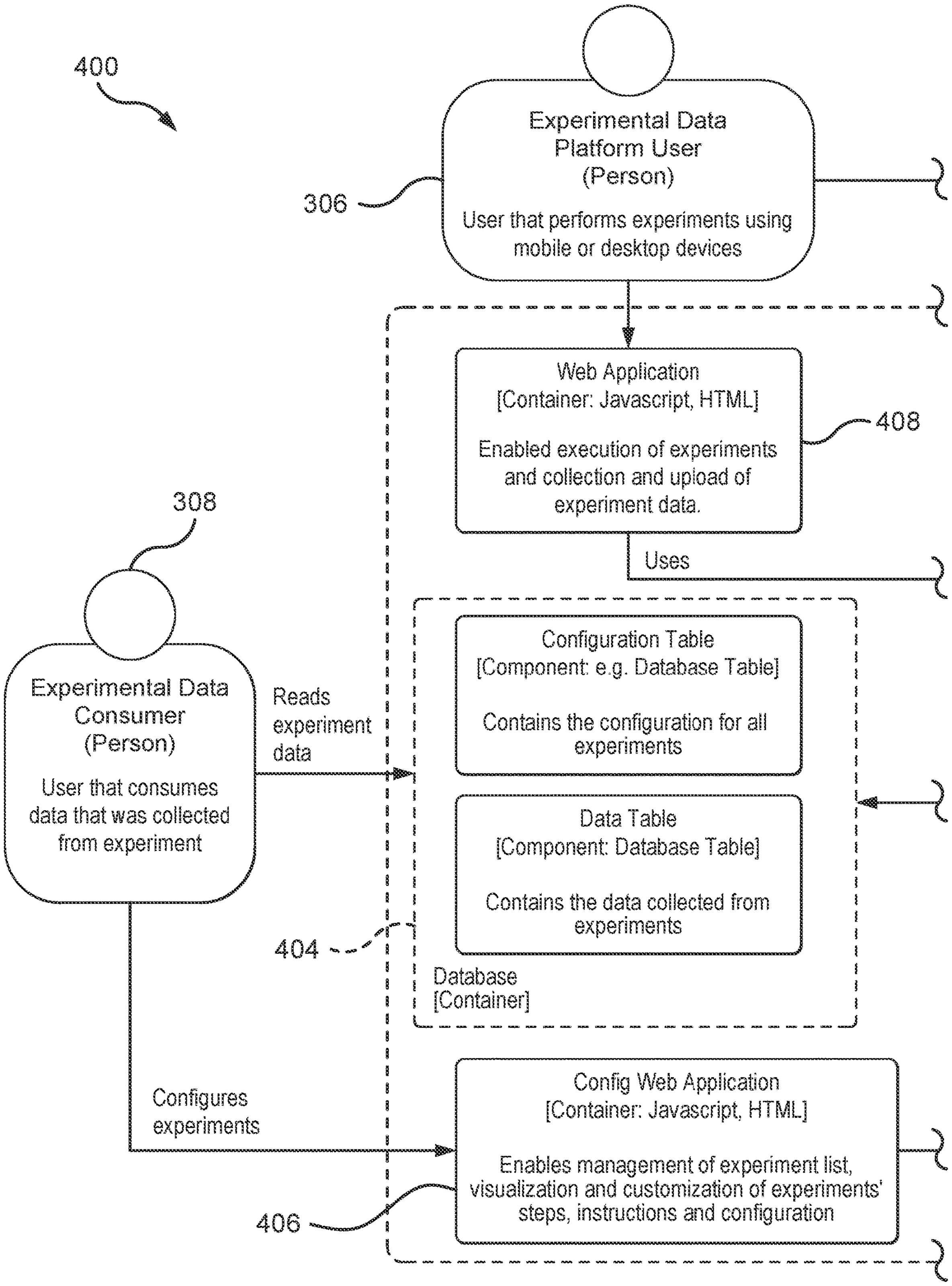
FIG. 4 is a block diagram illustrating an example container diagram of the experimental behavioral data capture platform of FIG. 1, in accordance with various aspects of the present disclosure.
Figure 4:
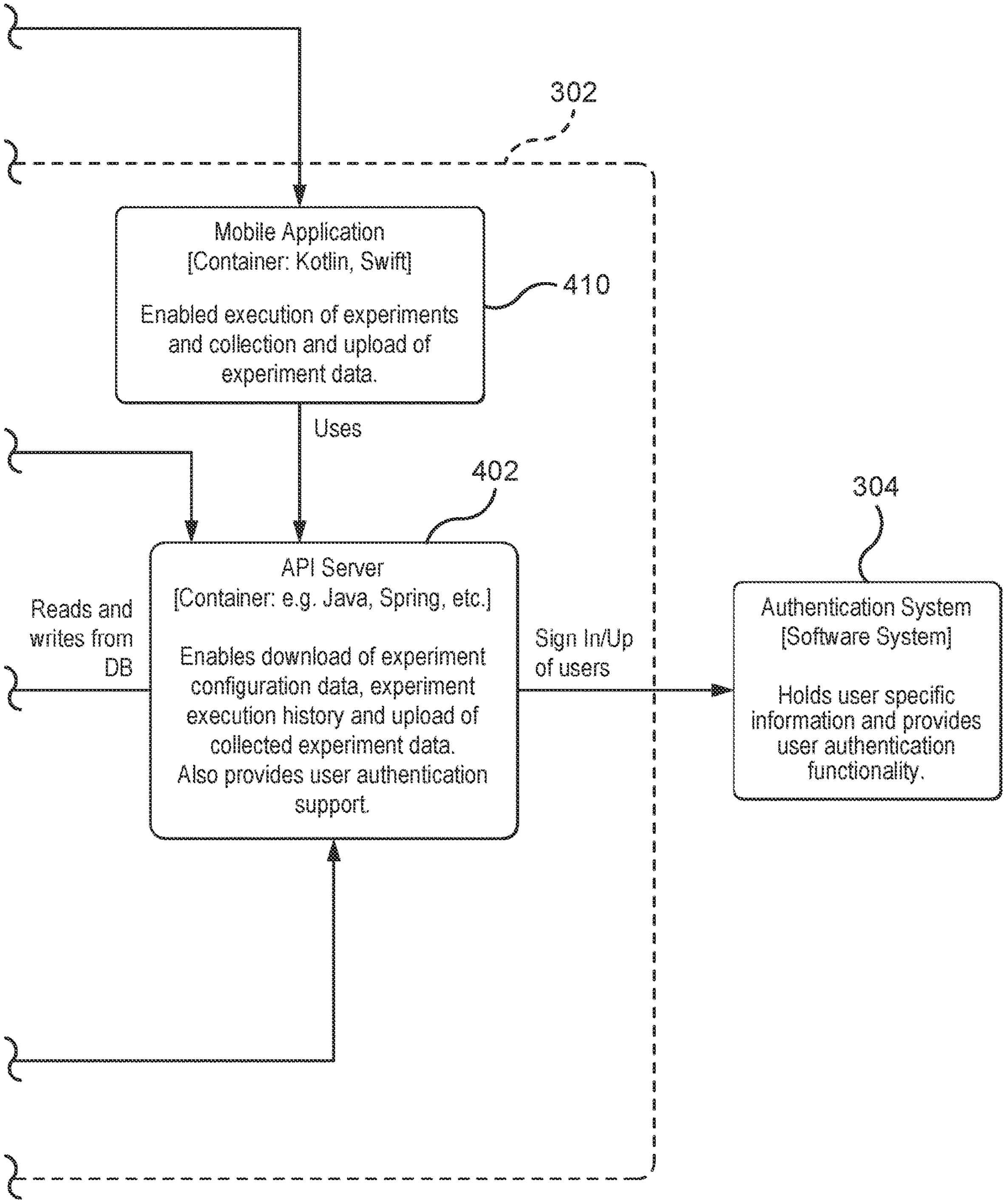

FIG. 4 is a block diagram illustrating an example container diagram 400 of the experimental behavioral data capture platform of FIG. 1, in accordance with various aspects of the present disclosure. In the example of FIG. 4, the example container diagram 400 includes an API server 402, a database 404, a configuration web application 406, a web application 408, and a mobile application 410.

The API server 402 corresponds to the API server 208 described above in FIGS. 2A-2C. The API server 402 provides several distinct functions: 1) enables downloading of experiment configuration data and experiment execution history, 2) uploading of collected experiment data, and 3) provides user authentication support by interfacing with the authentication system 304. The container of the API server 402 may include Java, Spring, or other suitable container.

The database 404 corresponds to the database 210 described above in FIGS. 2A-2C. The database 404 stores configuration of behavioral experiments (e.g., a list of available behavioral experiments) and collected experiment data. The container of the database 404 may include PostgresSQL, DynamoDB, or other suitable container.

The configuration web application 406 enables management of the list of available behavioral experiments, visualization, and customization of steps in each experiment along with instructions and configuration. The container of the configuration web application 406 may include Javascript, HTML, or other suitable container.

The web application 408 corresponds to the application 204 described above in FIGS. 2A-2C. The web application 408 enables execution of behavioral experiments along with collection and upload of experiment data. The container of the web application 408 may include Javascript, HTML, or other suitable container.

The mobile application 410 corresponds to the application 204 described above in FIGS. 2A-2C. The mobile application 410 enables execution of behavioral experiments along with collection and upload of experiment data. The container of the mobile application 410 may include Kotlin, Swift, or other suitable container.

As illustrated in FIG. 4, the behavioral experimental data platform user 306 performs behavioral experiments using the web application 408 and/or the mobile application 410. The web application 408 and the mobile application 410 each use the API server 402 to download experiment configuration data and experiment execution history, upload collected experiment data, and authenticate the behavioral experimental data platform user 306.

The API server 402 retrieves the behavioral experiment configuration data and experiment execution history from the database 404. The API server 402 stores the collected experiment data in the database 404. The API server 402 also authenticates the behavioral experimental data platform user 306 with the authentication system 304.

The behavioral experimental data consumer 308 configures behavioral experiments stored in the database 404 with the configuration web application 406. The behavioral experimental data consumer 308 also accesses collected experimental data stored in the database 404 with the configuration web application 406.

In some embodiments, the data consumer accesses the collected experimental data by connecting directly to the database (not through the config web app) and using an authorized database account. The data consumer, in practice, may be a data scientist that performs research and development work on the collected data and that accesses the data from its own research and development environment/application by connecting to the database directly and by using available database APIs. In some embodiments, the web configuration application is only used for creating, updating, or deleting experiment configuration files and does not provide access to collected data. In other embodiments, the config web app may also be used to return collected data.

Figure 5:
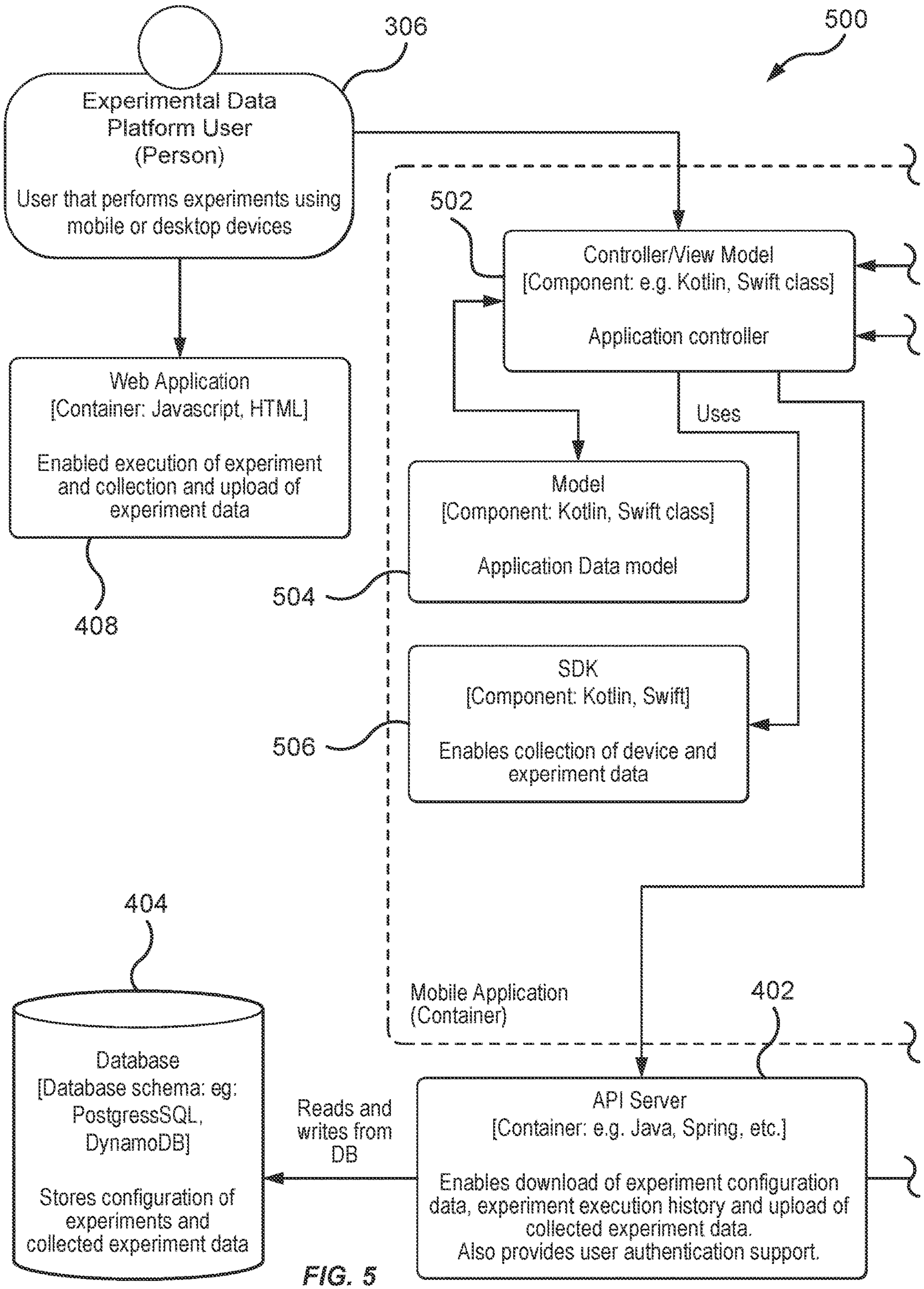
FIG. 5 is a block diagram illustrating an example mobile application of the experimental behavioral data capture platform of FIG. 1, in accordance with various aspects of the present disclosure.
Figure 5:
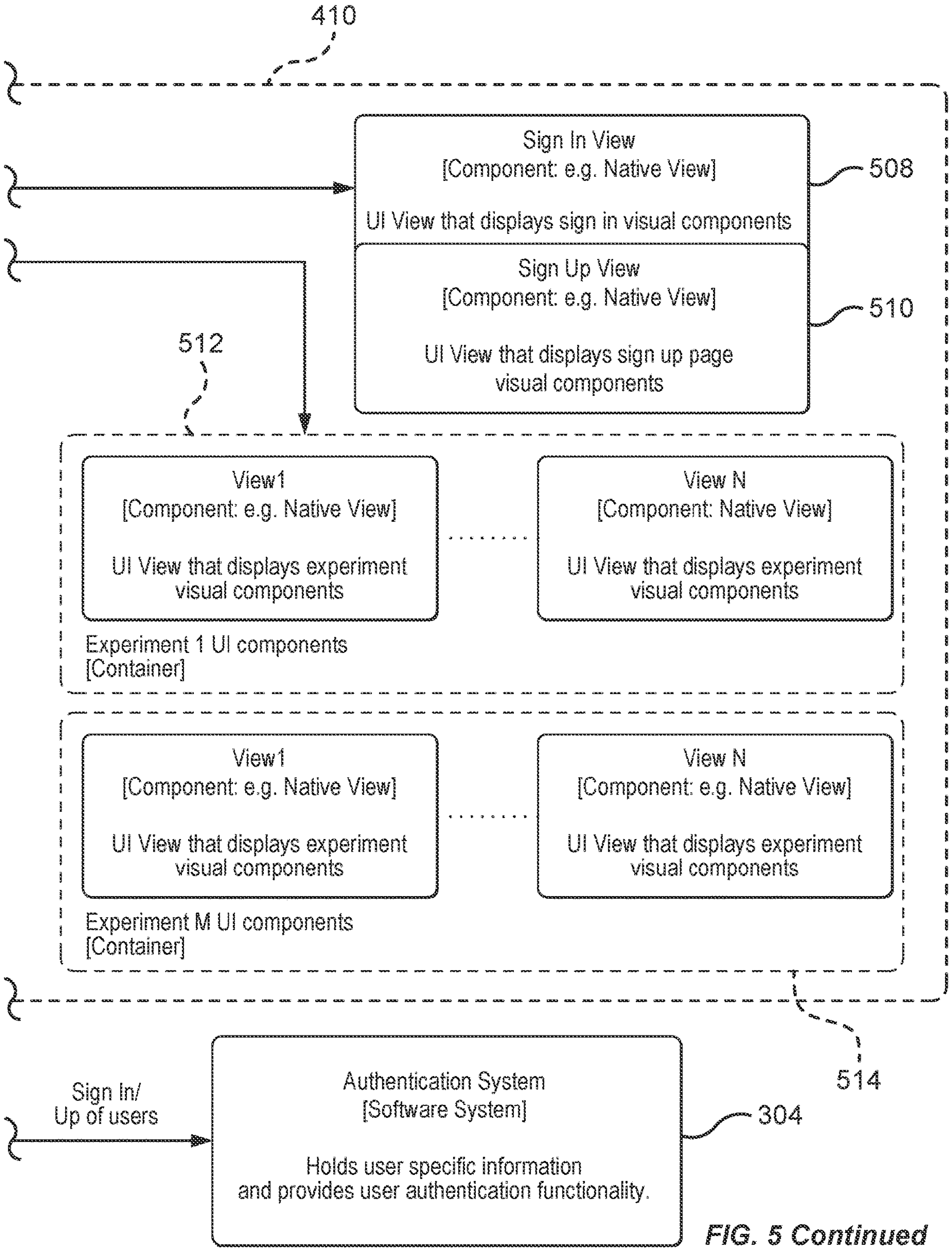

FIG. 5 is a block diagram illustrating an example mobile application 500 of the experimental behavioral data capture platform of FIG. 1, in accordance with various aspects of the present disclosure. The example mobile application 500 corresponds to the mobile application 204 of FIGS. 2A-2C.

In the example of FIG. 5, the example mobile application 500 includes an application controller 502, an application data model 504, an SDK 506, a sign in view 508, a sign up view 510, a plurality of views of a first experiment 512, and a plurality of views of an M-th experiment 514. In some examples, the example mobile application 500 may use Model View Controller (MVC), Model View Presenter (MVP) and Model View View-model (MVVM) architectural patterns. In these examples, the application data model 504 represents a collection of classes that describes logic and also defines rules for how data may be changed and manipulated.

The application controller 502 receives inputs from the behavioral experimental data platform user 306, performs authentication of the behavioral experimental data platform user 306, and requests a list of the available behavioral experiments from the API server 402 once the behavioral experimental data platform user 306 is authenticated. The API server 402 requests a list of the available behavioral experiments from the database 404 and receives the list of the available behavioral experiments from the database 404 after the sending the request. Upon receiving the list of available behavioral experiments from the database 404, the API server 402 sends the list of available behavioral experiments to the application controller 502.

In some embodiments, after retrieving the available behavioral experiments and the corresponding configurations, when the behavioral experimental data platform user 306 does not have an existing account, the application controller 502 displays the sign up view 510 to the behavioral experimental data platform user 306. The behavioral experimental data platform user 306 enters required information and submits the information at the sign up view 510. The application controller 502 takes the submitted information from the behavioral experimental data platform user 306 and transmits the submitted information to the API server 402 as a "sign up." The API server 402 acknowledges the "sign up" with a sign up response to the application controller 502.

After retrieving the available behavioral experiments and the corresponding configurations, when the behavioral experimental data platform user 306 has an existing account, the application controller 502 displays the sign in view 508 to the behavioral experimental data platform user 306. The behavioral experimental data platform user 306 enters required information and submits the information at the sign in view 508. The application controller 502 takes the submitted information from the behavioral experimental data platform user 306 and transmits the submitted information to the API server 402 as a "sign in." The API server 402 acknowledges the "sign in" with a sign in response to the application controller 502.

Once a behavioral experiment is launched or selected from the list of available behavioral experiments, the application controller 502 initializes the behavioral experiment with the SDK 506. The SDK 506 provides an initialization response back to the application controller 502. The application controller 502 applies a behavioral experiment configuration to the SDK 506.

After applying the behavioral experiment configuration to the SDK 506, the application controller 502 displays a behavioral experiment page or experiment view. For example, the application controller 502 displays one view from the plurality of views of the first experiment 512 or one view from the plurality of views of the M-th experiment 514. Upon displaying the behavioral experiment page or experiment view, the application controller 502 registers listeners (i.e., user input tracking) for the behavioral experiment page or experiment view with the SDK 506.

The behavioral experimental data platform user 306 performs the behavioral experiment. Specifically, the behavioral experimental data platform user 306 interacts with the behavioral experiment page according to experiment steps and instructions on the behavioral experiment page. To advance to the next page (e.g., the next experiment page), the behavioral experimental data platform user 306 swipes or clicks submit as described in the instructions on the behavioral experiment page. After the behavioral experimental data platform user 306 performs the behavioral experiment and advances to the next page, the application controller 502 closes the behavioral experiment page or experiment view.

After closing the behavioral experiment page or experiment view, the application controller 502 requests payload data indicating the captured inputs of the behavioral experimental data platform user 306 from the registered listeners. In response to the payload request, the SDK 506 provides the application controller 502 with the payload data. The application controller 502 uploads experiment data including some or all of the payload data to the API server 402. In addition to some or all of the payload data, the behavioral experiment data may include a timestamp, a behavioral experiment ID, a data set used, a configuration used, a page number, a session number, an iteration number, a channel (e.g., application or browser), and a platform (e.g., android, IOS, Windows, Mac, or other software platform). The timestamp may include both a start time (when page is displayed and collection of data starts) and an end time (after user fills in entire page, when page is closed and collection of data stops).

In response to receiving the behavioral experiment data, the API server 402 uploads the behavioral experiment data to the database 404. The database 404 provides a data upload response to the API server 402. The API server 402 forwards the data upload response to the application controller 502.

Figure 6:
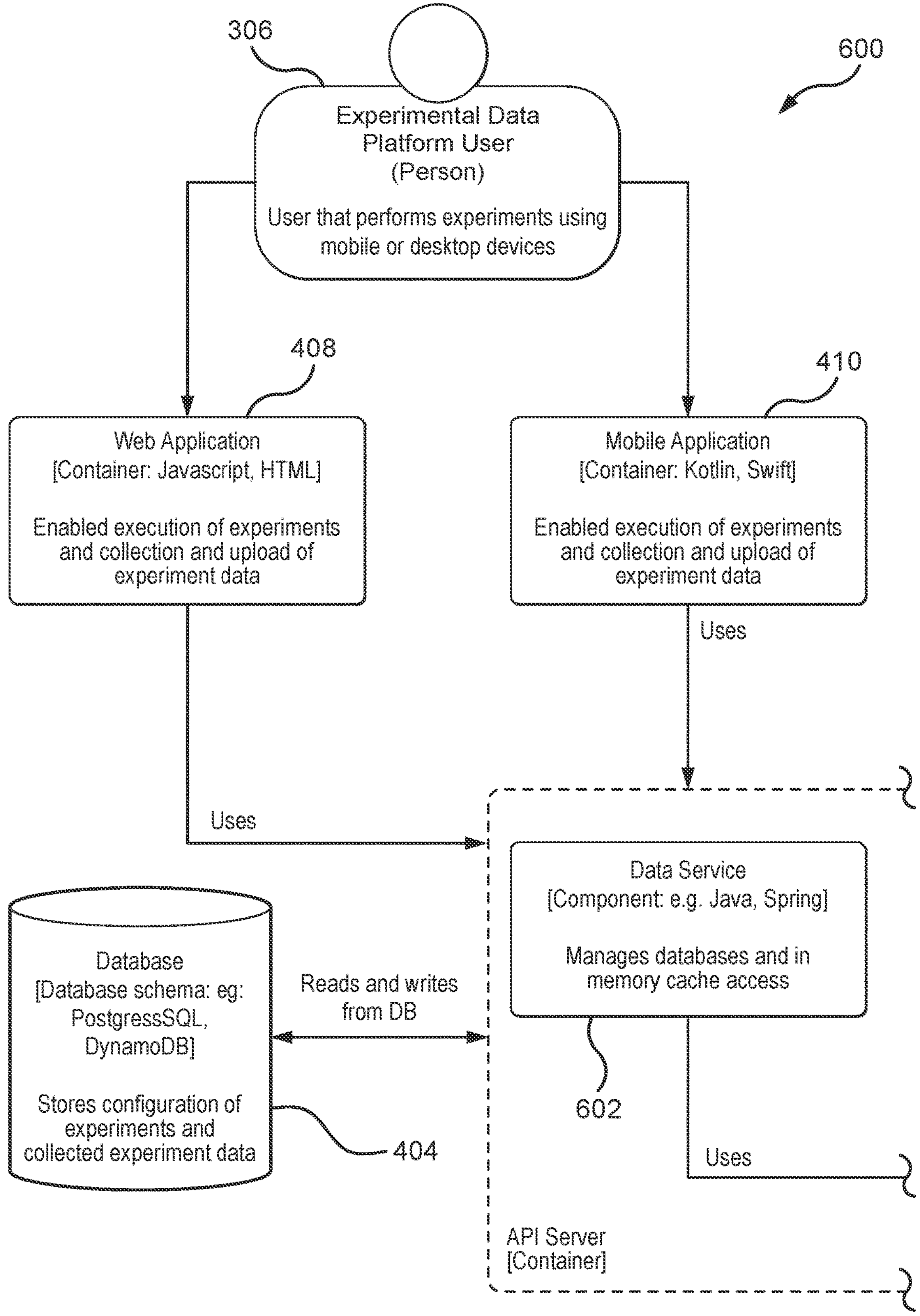
FIG. 6 is a block diagram illustrating an example API server of the experimental behavioral data capture platform of FIG. 1, in accordance with various aspects of the present disclosure.
Figure 6:
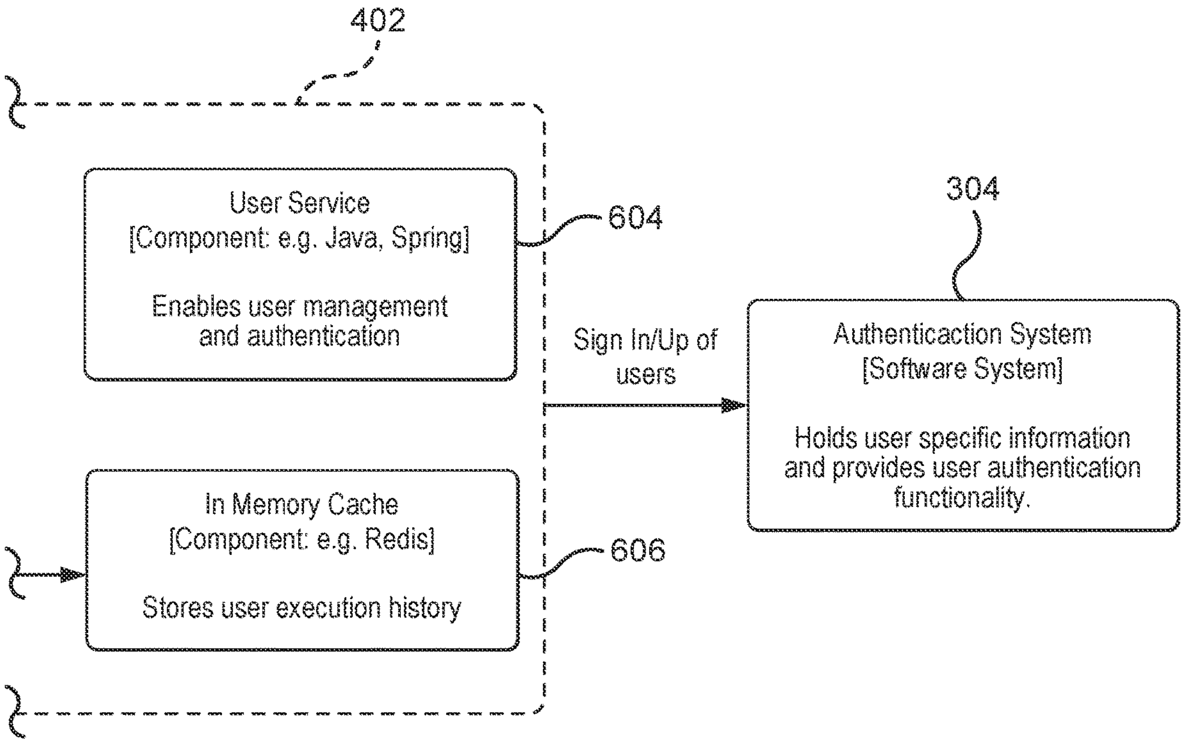

FIG. 6 is a block diagram illustrating an example API server 402 of the experimental behavioral data capture platform of FIG. 1, in accordance with various aspects of the present disclosure. The API server 402 corresponds to the API server 208 of FIGS. 2A-2C.

In the example of FIG. 6, the API server 402 includes a data service 602, a user service 604, and an in memory cache 606. The data service 602 manages databases and in memory cache access. The user service 604 manages users and user authentication. The in memory cache 606 stores user execution history.

For example, the data service 602 may limit access to the user execution history in the in memory cache 606 to administrative users and specific user execution history to the associated user (i.e., the user execution history of the behavioral experimental data platform user 306 is limited to the behavioral experimental data platform user 306).

Figure 7:
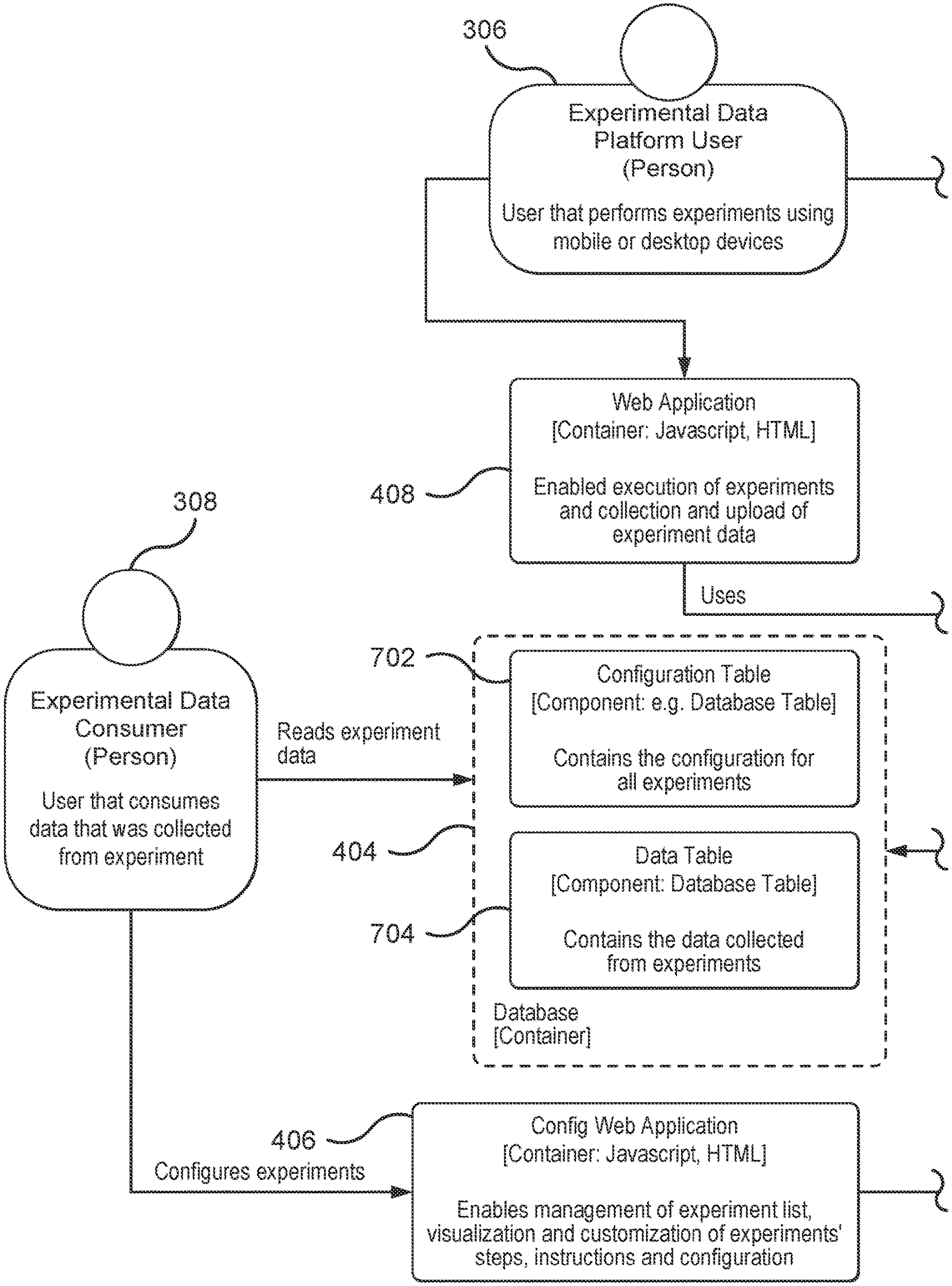
FIG. 7 is a block diagram illustrating an example database of the experimental behavioral data capture platform of FIG. 1, in accordance with various aspects of the present disclosure.
Figure 7:
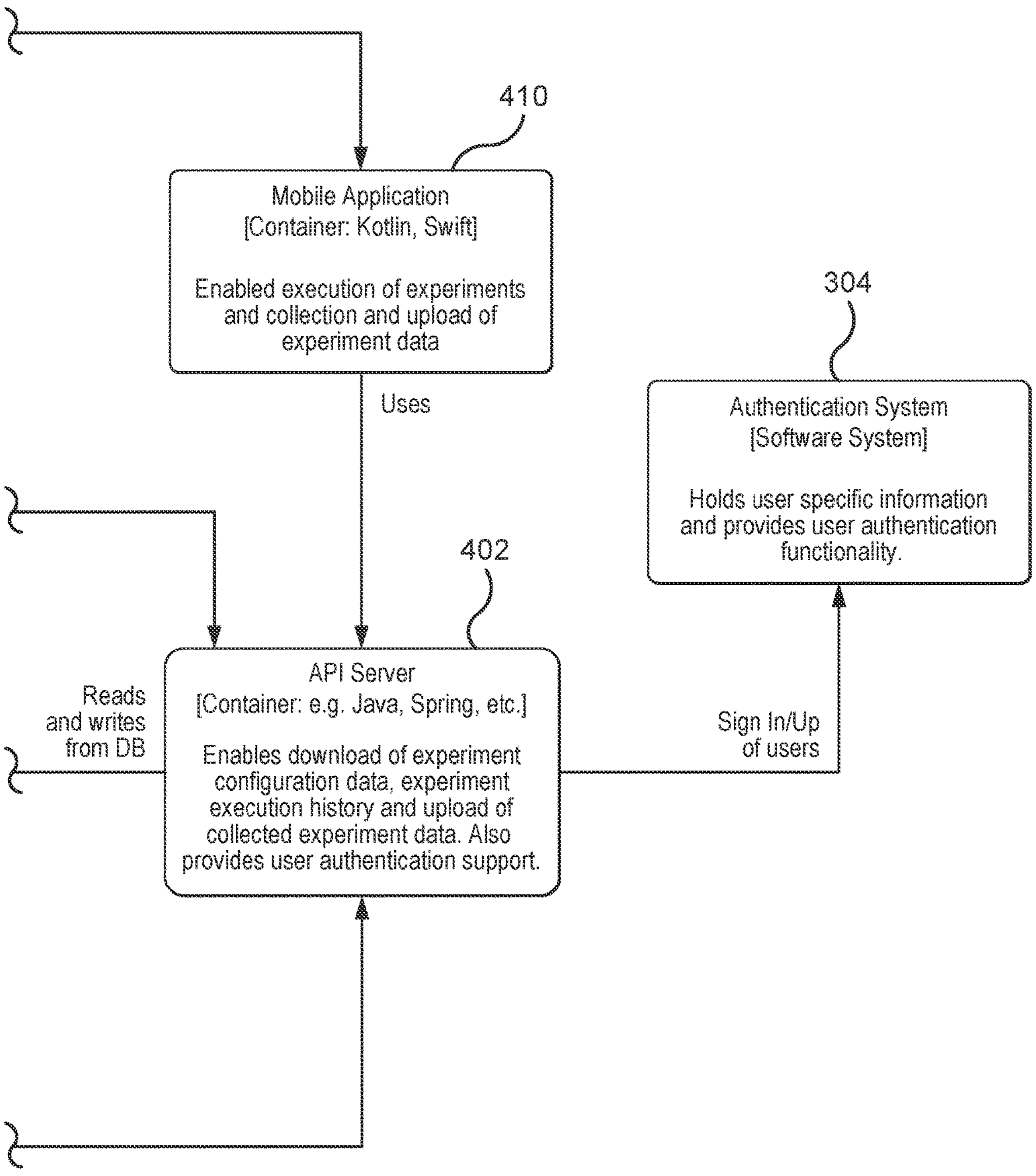

FIG. 7 is a block diagram illustrating an example database 700 of the experimental behavioral data capture platform of FIG. 1, in accordance with various aspects of the present disclosure. The database 404 corresponds to the database 210 of FIGS. 2A-2C.

In the example of FIG. 7, the database 404 includes a configuration table 702 and a data table 704. The configuration table 702 contains the configuration for all behavioral experiments. The data table 704 contains the data collected from the behavioral experiments. In some examples, the configuration table 702 and the data table 704 may each be a collection or multiple tables.

Figure 8A:
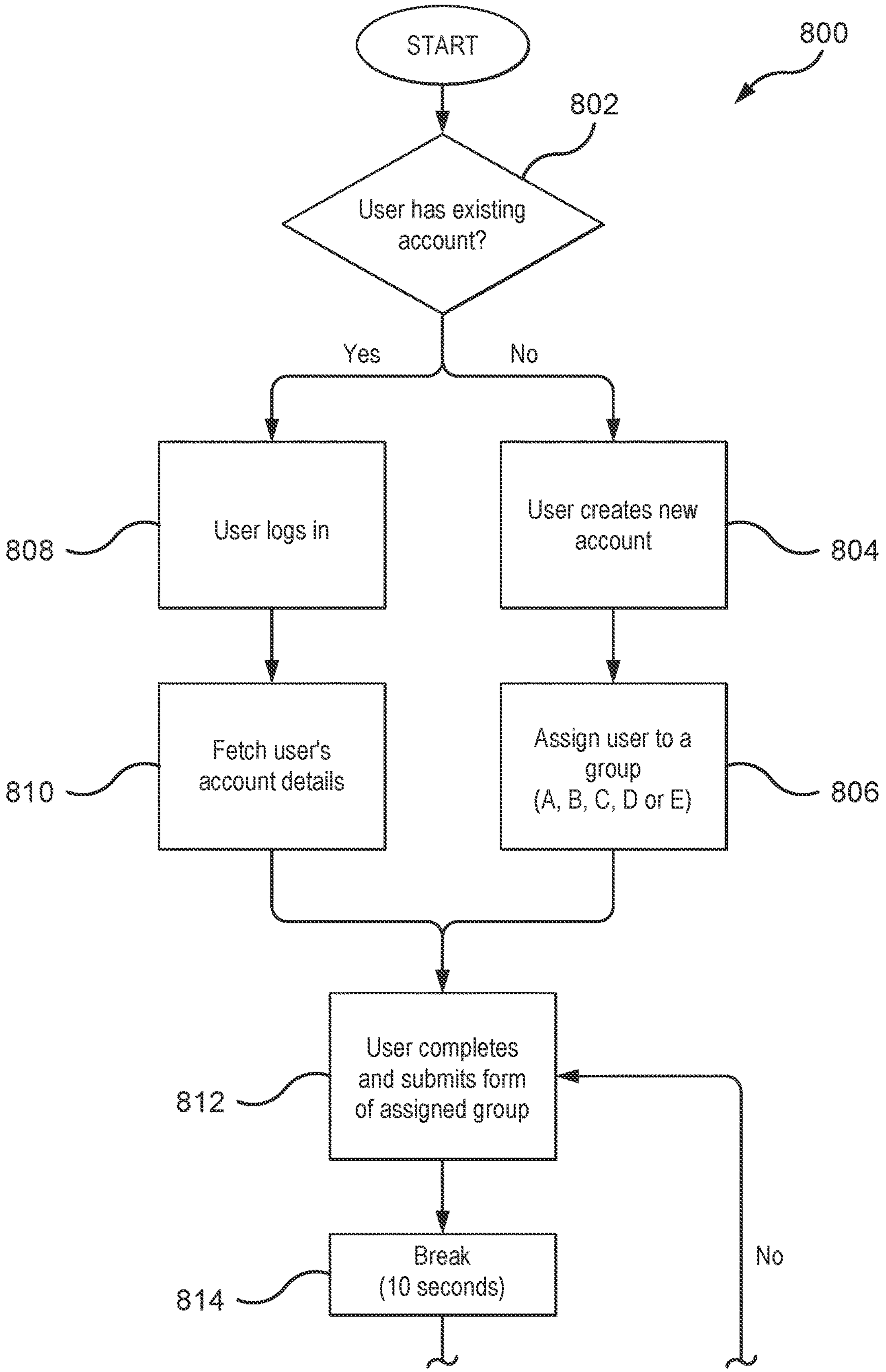
FIGS. 8A and 8B is a flow diagram illustrating an example user session process of the experimental behavioral data capture platform of FIG. 4, in accordance with various aspects of the present disclosure.
Figure 8B:
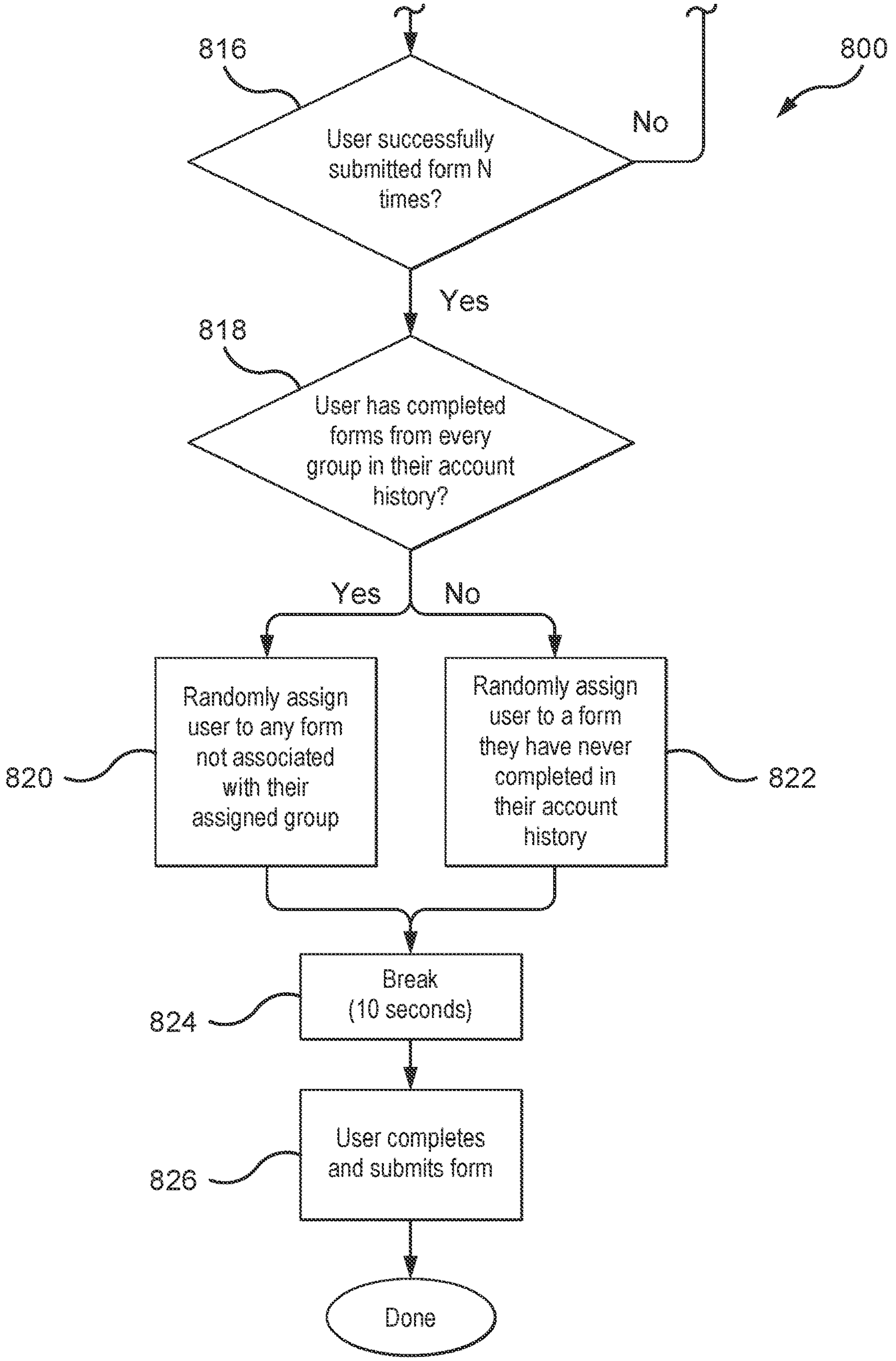

FIGS. 8A and 8B is a flow diagram illustrating an example user session process 800 of the experimental behavioral data capture platform 302 of FIG. 4, in accordance with various aspects of the present disclosure.

In the example of FIG. 8A, the example user session process 800 includes the experimental behavioral data capture platform 302 determining whether a user has an existing account (at decision block 802). In response to determining that the user does not have an existing account ("NO" at decision block 802), the experimental behavioral data capture platform 302 requires the user to create a new account (at block 804). Upon the user's creation of the new account, the experimental behavioral data capture platform 302 assigns the user to a group (e.g., group A, group B, group C, group D, group E, or other suitable grouping) (at block 806).

In response to determining that the user does have an existing account ("YES" at decision block 802), the experimental behavioral data capture platform 302 logs the user into the user's account (at block 808). Upon the user's creation of the new account, the experimental behavioral data capture platform 302 fetches the user's account details including the user's assigned group (e.g., group A, group B, group C, group D, group E, or other suitable grouping) (at block 810).

Once the user's assigned grouping is known, the experimental behavioral data capture platform 302 provides forms of the assigned group to the user, which the user completes and submits (at block 812). The forms are forms of a particular experiment.

In the example of FIG. 8B, after the user completes and submits the forms of the assigned group, the experimental behavioral data capture platform 302 pauses for a predetermined period of time (at block 814). For example, the predetermined period of time may be ten seconds or other suitable predetermined period of time.

After pausing for the predetermined period of time, the experimental behavioral data capture platform 302 determines whether a user successfully submitted the forms of the assigned group a predetermined N number of times (e.g., three times) to the experimental behavioral data capture platform 302 (at decision block 816). In response to determining that the user did not successfully submit the forms of the assigned group the predetermined N number of times to the experimental behavioral data capture platform 302 ("NO" at decision block 816), the experimental behavioral data capture platform 302 provides forms of the assigned group to the user, which the user completes and submits (at block 812). In response to determining that the user did successfully submit the forms of the assigned group the predetermined N number of times to the experimental behavioral data capture platform 302 ("YES" at decision block 816), the experimental behavioral data capture platform 302 determines whether the user has completed forms from every group in their account history (at decision block 818).

In response to determining that the user has completed forms from every group in their account history ("YES" at decision block 818), the experimental behavioral data capture platform 302 randomly assigns the user to any form not associated with their assigned group (at block 820). In response to determining that the user has not completed forms from every group in their account history ("NO" at decision block 818), the experimental behavioral data capture platform 302 randomly assigns the user to a form they have not completed in their account history (at block 822).

In the example of FIG. 8B, after the experimental behavioral data capture platform 302 randomly assigns the user to any form not associated with their assigned group or randomly assigns the user to a form they have not completed in their account history, the experimental behavioral data capture platform 302 pauses for a predetermined period of time (at block 824). For example, the predetermined period of time may be ten seconds or other suitable predetermined period of time. After the predetermined period of time, the experimental behavioral data capture platform 302 receives the completed and submitted form from the user (at block 826).

Figure 9A:
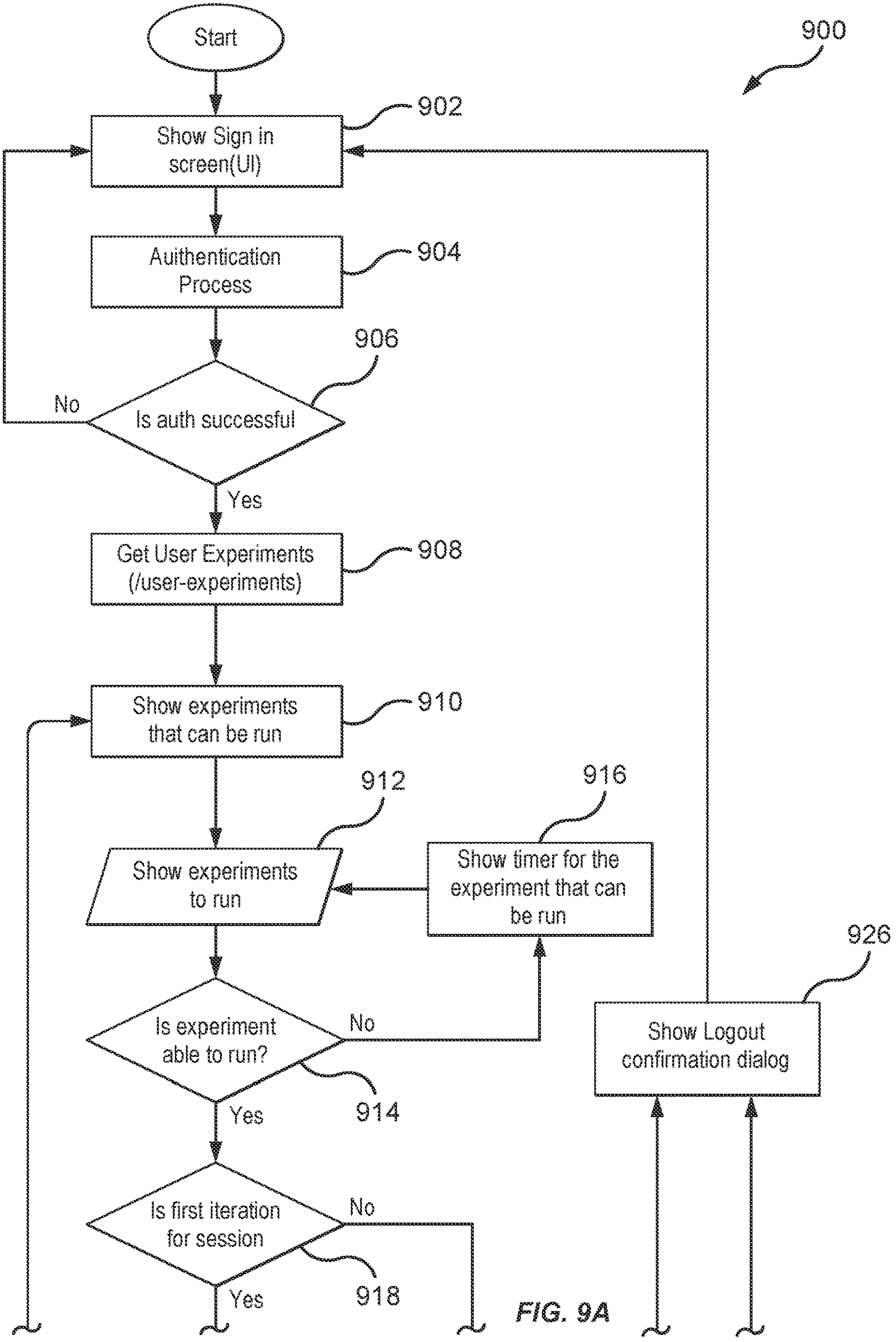
FIGS. 9A and 9B is a flow diagram illustrating a first example screen flow of the mobile application of FIG. 5, in accordance with various aspects of the present disclosure.
Figure 9B:
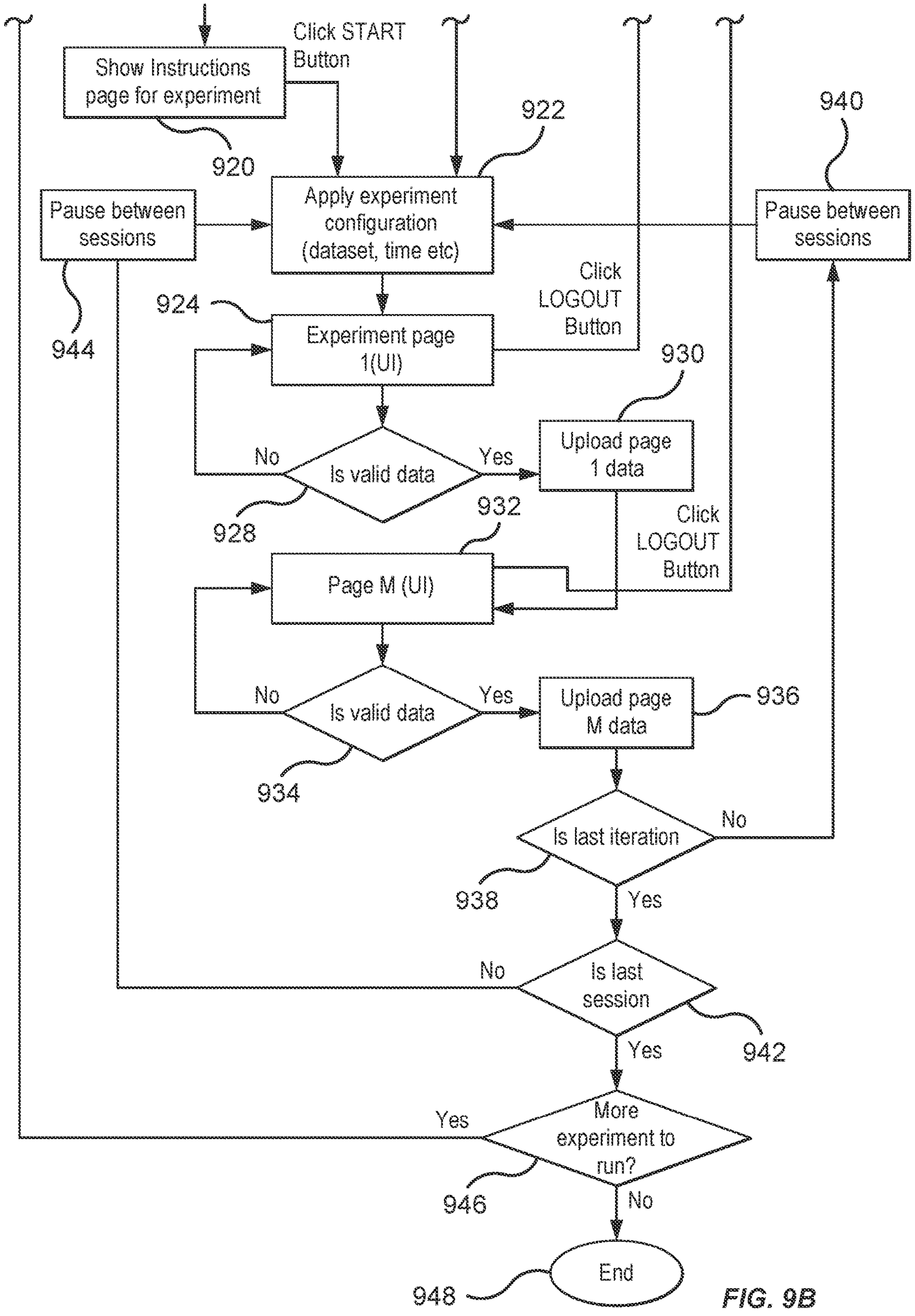
Figure 11:
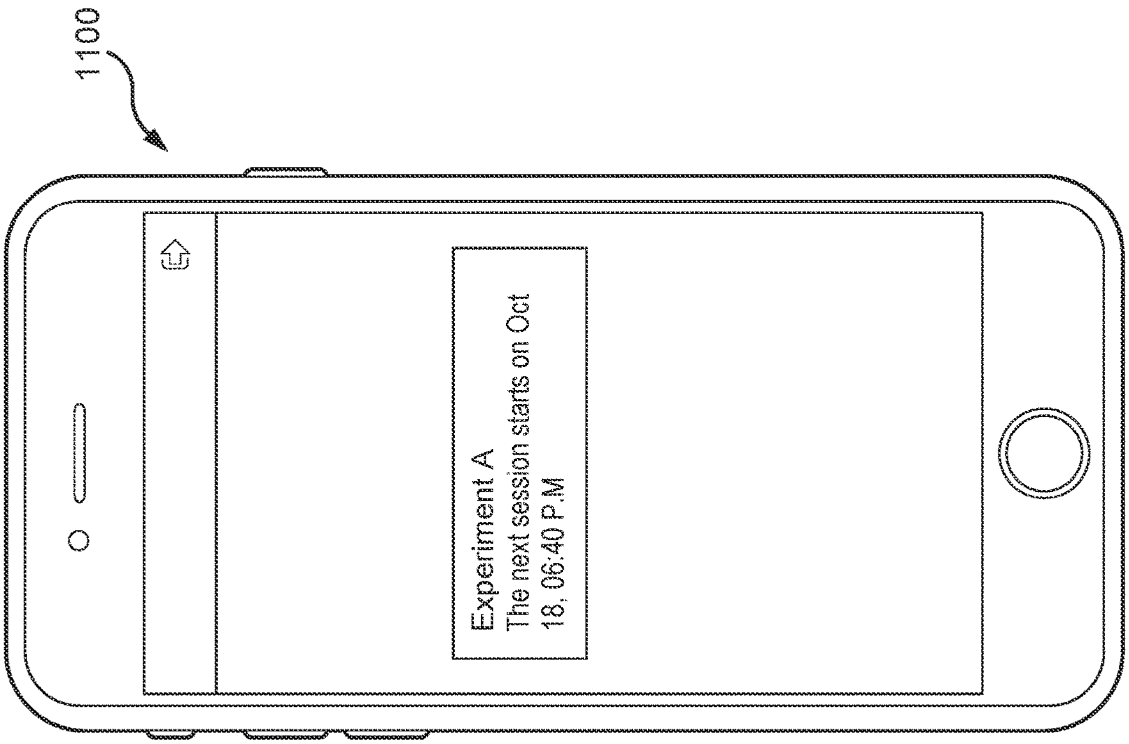
FIGS. 10-18 are images illustrating example user interface screens of a single experiment with the mobile application of FIG. 5, in accordance with various aspects of the present disclosure.
Figure 10:
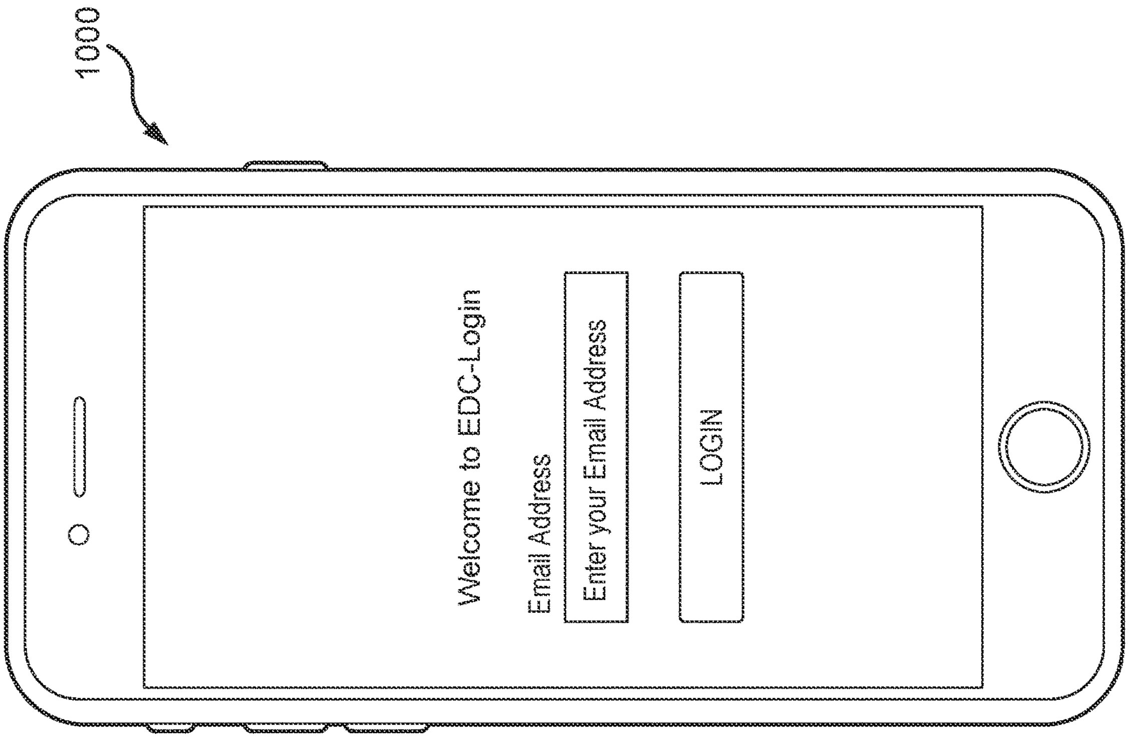

FIGS. 9A and 9B is a flow diagram illustrating a first example screen flow 900 of the mobile application 410 of FIG. 5, in accordance with various aspects of the present disclosure. In the example of FIG. 9A, the mobile application 410 shows a sign up screen or a sign in screen (e.g., a native view (i.e., View on Android or UIView on iOS) or a webview) (at block 902). After receiving sign up information at the sign up screen or login information at the sign in screen, the mobile application 410 runs an authentication process (at block 904). The mobile application 410 then determines whether the authentication is successful (at decision block 906). In response to determining that the authentication is not successful ("NO" at decision block 906), the mobile application 410 shows a retry screen (UI) (at block 902) and re-attempts the authentication process (at block 904).

In response to determining that the authentication is successful ("YES" at decision block 906), the mobile application 410 requests a list of behavioral experiments that can be performed (at block 908). The mobile application 410 then displays a list of behavioral experiments that can be performed (UI) on a display screen of a mobile device (e.g., the first user device 130) (at block 910).

The mobile application 410 receives a user input at the mobile device selecting a behavioral experiment to run from the list of behavioral experiments (at block 912). The mobile application 410 then determines whether the behavioral experiment that is selected can be performed by the user (at decision block 914).

In response to determining that the behavioral experiment that is selected cannot be performed by the user ("NO" at decision block 914), the mobile application 410 shows a timer indicating the amount of time before the behavioral experiment can be performed by the user (at block 916). In response to determining that the selected behavioral experiment can be performed by the user ("YES" at decision block 914), the mobile application determines whether this is a first iteration for a session of the behavioral experiment (at decision block 918).

In the example of FIG. 9B, in response to determining that it is the first iteration for the session of the behavioral experiment ("YES" at decision block 918), the mobile application 410 displays instructions page of the behavioral experiment on the display screen of the mobile device (at decision block 920). Upon receiving an indication that the user selected a "START" button at the instructions page or in response to determining that it is not the first iteration for the session of the behavioral experiment, the mobile application 410 applies an experiment configuration (e.g., dataset, time, etc.) (at block 922).

Upon applying the experiment configuration, the mobile application 410 displays experiment page 1 of a user interface (UI) at the display screen of the mobile device (at block 924). When the user selects a logout button on the experiment page 1, the mobile application 410 displays a logout confirmation dialog (at block 926) and reverts to the sign in screen (at block 902). When the user completes the experiment page 1, the mobile application 410 determines whether experiment 1 page data is valid data (at decision block 928). In response to determining that the experiment 1 page data is not valid data ("NO" at decision block 928), the mobile application 410 again displays experiment page 1 at the display screen of the mobile device (at block 924).

Figure 13:
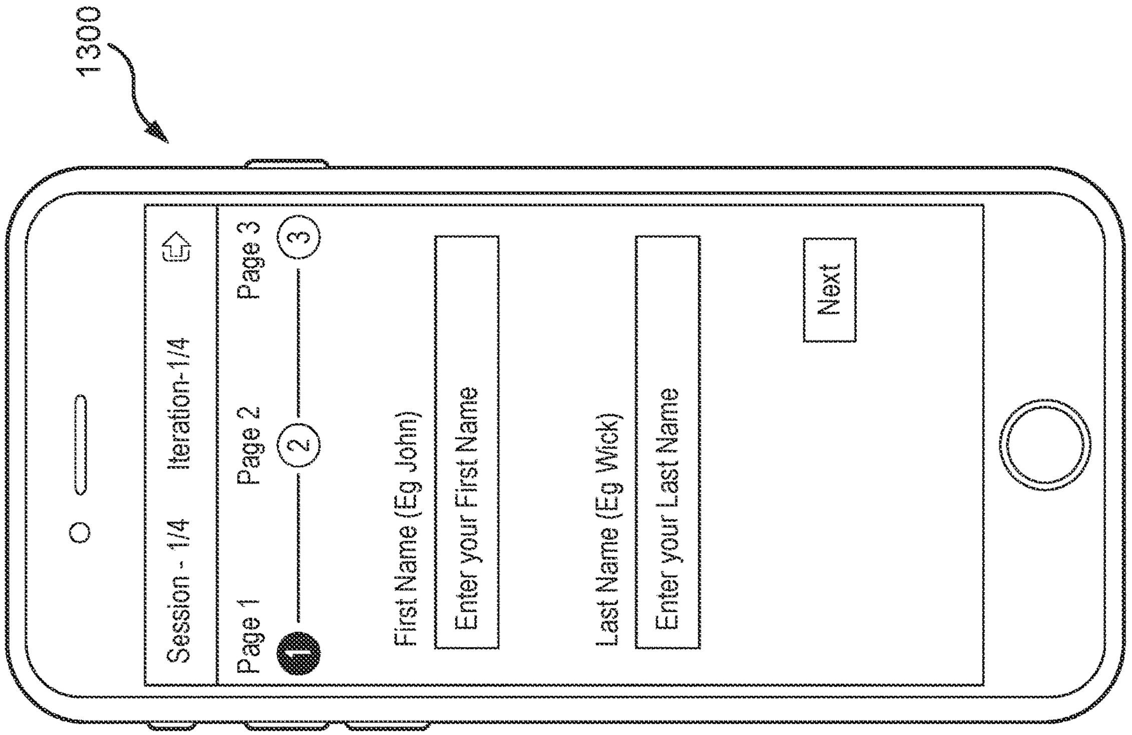
Figure 12:
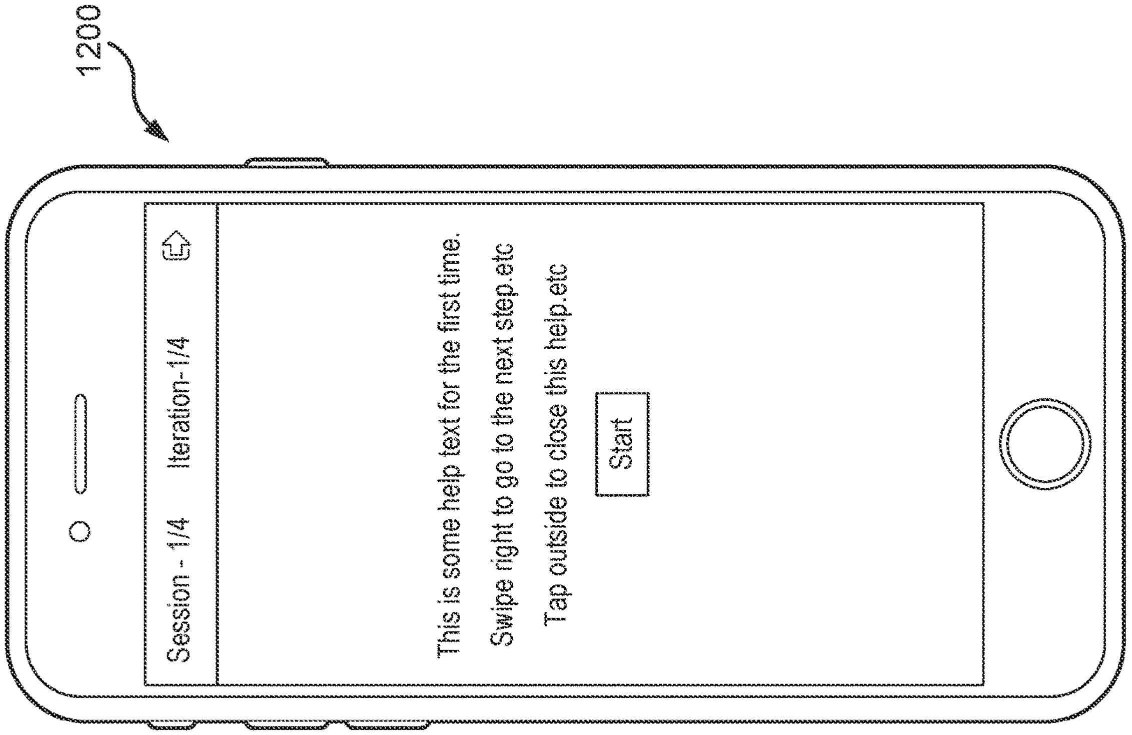
Figure 14:
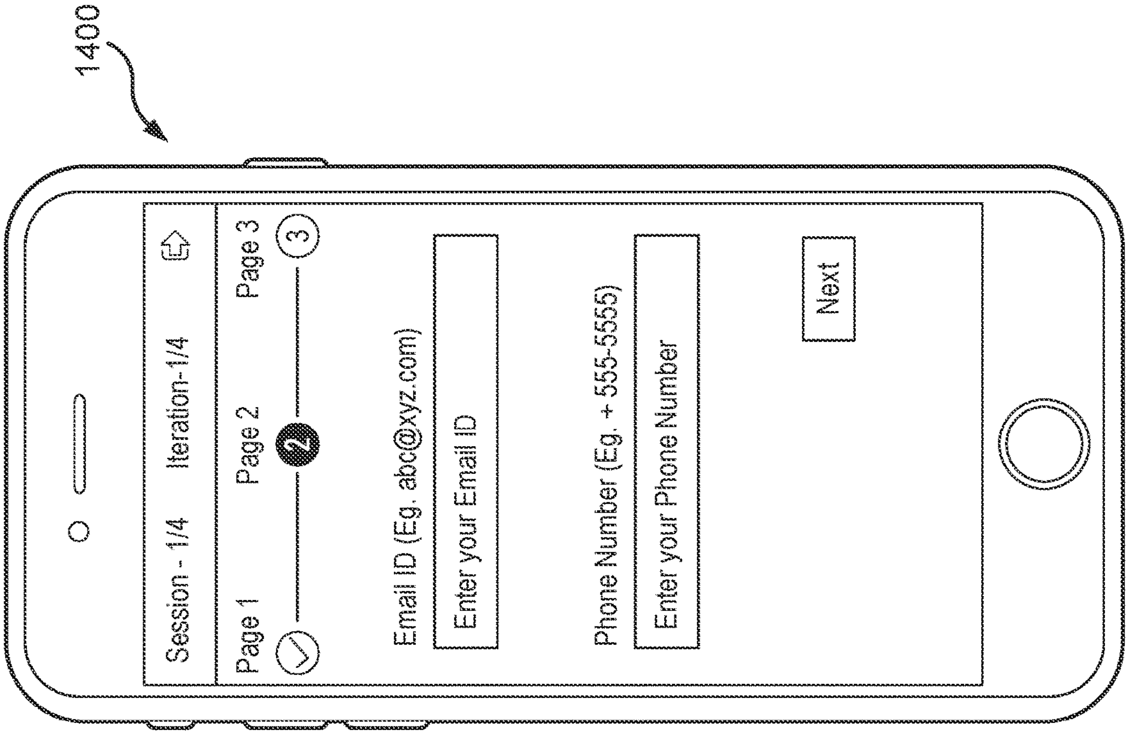
Figure 15:
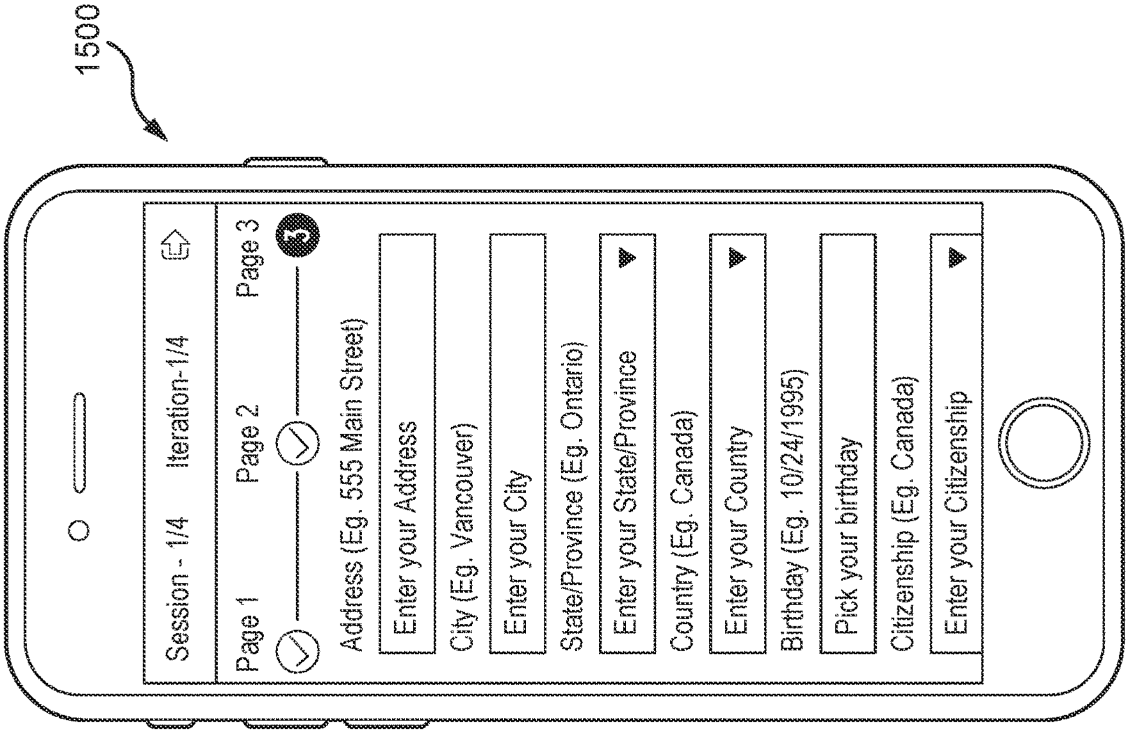
Figure 16:
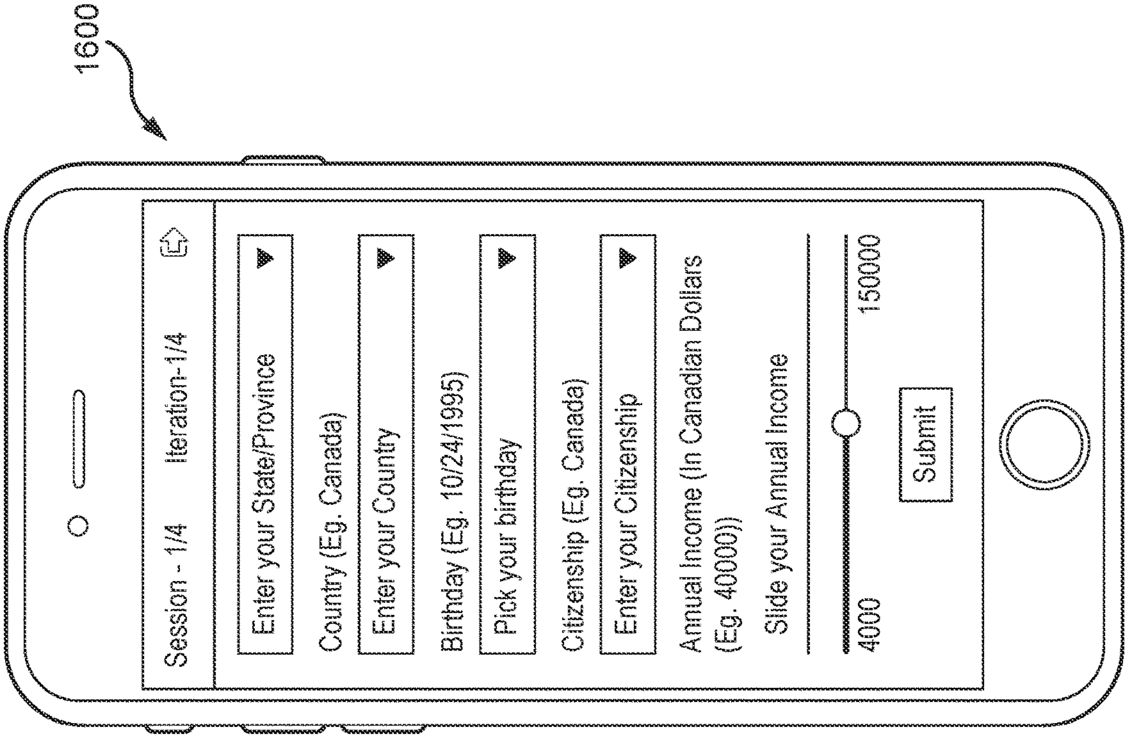
Figure 17:
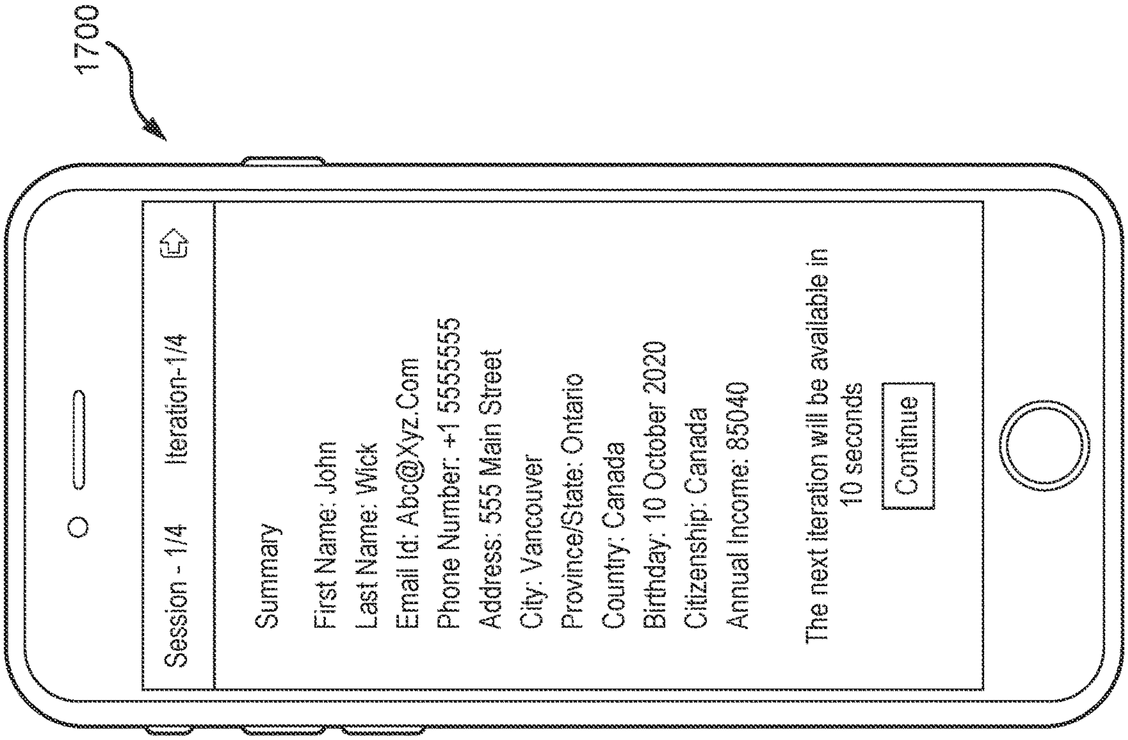
Figure 18:
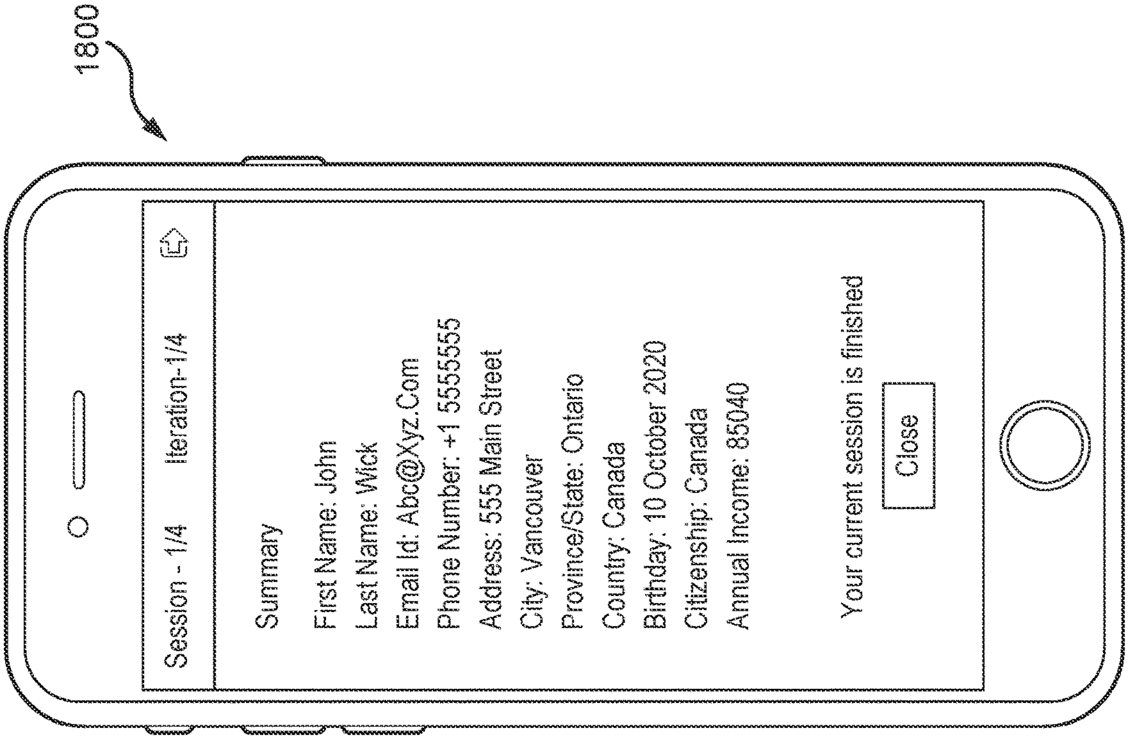

The user is expected to fill in each input field on the experiment page 1 with the values displayed above the corresponding input field values. For example, see FIGS. 13-15, where the user is expected to enter First Name (e.g., John) in the first name edit text field. These values come from the assigned dataset for the specific user and specific experiment iteration. The values entered by the user must match the values displayed for each input field. That is the meaning of "valid data." The user can only advance to the next page by clicking submit for swipe after the user provides valid data, where valid data means all input fields are filled in with the expected value.

In response to determining that the experiment 1 page data is valid data ("YES" at decision block 928), the mobile application 410 uploads the experiment page 1 data to an API server (at block 930). In some examples, the experiment 1 page data may include the behavioral experiment identifier (ID), the behavioral experiment configuration, the input data collection (i.e., the behavioral data), and any other suitable experiment information.

In some examples, the mobile application 410 may determine whether the upload is successful. In response to determining that the upload is not successful, the mobile application 410 shows a retry screen (UI). In response to determining that the upload is successful, the mobile application 410 shows a successful upload screen.

After successfully uploading an experiment page to the API server (at block 930), the mobile application 410 displays the next experiment page M of the UI at the display screen of the mobile device (at block 932). When the user selects a logout button on the next experiment page M, the mobile application 410 displays a logout confirmation dialog (at block 926) and reverts to the sign in screen (at block 902). When the user completes the experiment page M, the mobile application 410 determines whether experiment M page data is valid data (at decision block 934). In response to determining that the experiment M page data is not valid data ("NO" at decision block 934), the mobile application 410 again displays experiment page M at the display screen of the mobile device (at block 932). In response to determining that the experiment M page data is valid data ("YES" at decision block 934), the mobile application 410 uploads the experiment M page data to an API server (at block 936).

In some examples, the experiment M page data may include the behavioral experiment identifier (ID), the behavioral experiment configuration, the input data collection (i.e., the behavioral data), and any other suitable experiment information.

In some examples, the mobile application 410 may determine whether the upload is successful. In response to determining that the upload is not successful, the mobile application 410 shows a retry screen of the UI. In response to determining that the upload is successful, the mobile application 410 shows a successful upload screen of the UI.

Upon running the behavioral experiment, the mobile application 410 determines whether the last iteration of the behavioral experiment is performed by the user (at decision block 938). In response to determining that the last iteration of the behavioral experiment performed by the user is not the last iteration of the current session of the behavioral experiment ("NO" at decision block 938), the mobile application 410 pauses between iterations (at block 940) and re-applies the experiment configuration (at block 922).

In some examples, an experiment session has multiple iterations (e.g., four iterations for experiment 1) and in each iteration there are multiple pages (e.g., experiment 1 has three pages). Description provided from a configuration json file of experiment 1 may be the following: "There are three pages in an iteration. To complete an iteration, click the Submit button on the last page.", "There are four iterations in this session. To complete the session, you will perform four iterations separated by a 10-second pause.", "We ask that you complete this session (all four iterations) in one sitting.", and "To complete the full experiment, you will perform four sessions over a span of eight days."

In some examples, the pauses between iterations may be ten seconds. These pauses give breaks to the user, which may help reduce fatigue and maintain consistency of the behavioral data.

In response to determining that the last iteration of the current session of the behavioral experiment is performed by the user ("YES" at decision block 938), the mobile application 410 determines whether the behavioral experiment is the last session (at decision block 942). In response to determining that the behavioral experiment is not the last session required to complete the full behavioral experiment ("NO" at decision block 942), the mobile application 410 pauses between different sessions of the same behavioral experiment (at block 944) and re-applies the experiment configuration (at block 922).

In some examples, the pauses between sessions may be one day. These pauses are put in place to give breaks to the user, which may help reduce fatigue and maintain consistency of the behavioral data. In some examples, an experiment session may include four iterations. Once all four iterations of an experiment session are completed, the experiment session is completed, and the user may select a different experiment or may wait for the pause to end before performing the experiment again. In yet other examples, each user may be asked to complete four sessions as a minimum requirement over the course of eight business days, and each user is limited to one session per day.

In response to determining that the behavioral experiment is the last session required to complete the full behavioral experiment ("YES" at decision block 942), the mobile application 410 determines whether there are more behavioral experiments to be performed by the user (at decision block 946). In response to determining that there are more behavioral experiments to be performed by the user ("YES" at decision block 946), the mobile application 410 shows behavioral experiments that can be performed by the user (at block 910). In response to determining that there are no behavioral experiments to be performed by the user ("NO" at decision block 946), the mobile application 410 ends the first example screen flow 900 (at block 948).

Figure 19:
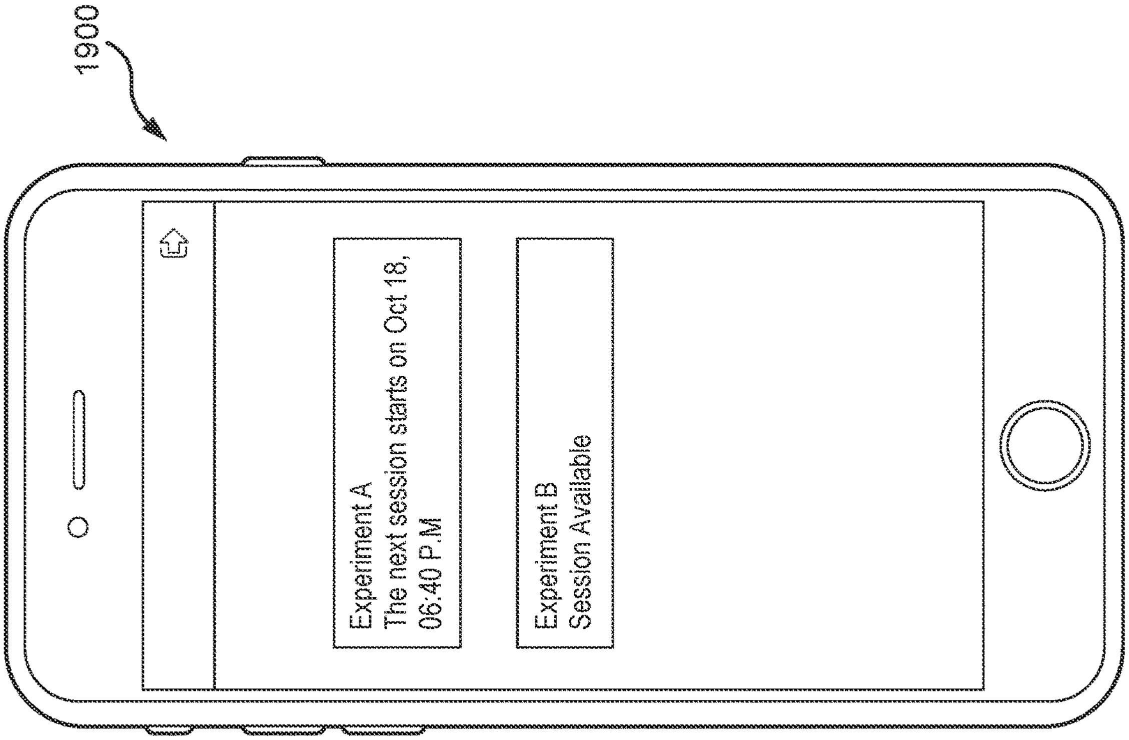
FIG. 19 is an image illustrating an example user interface screen of a plurality of experiments with the mobile application of FIG. 5, in accordance with various aspects of the present disclosure.
Figure 20:
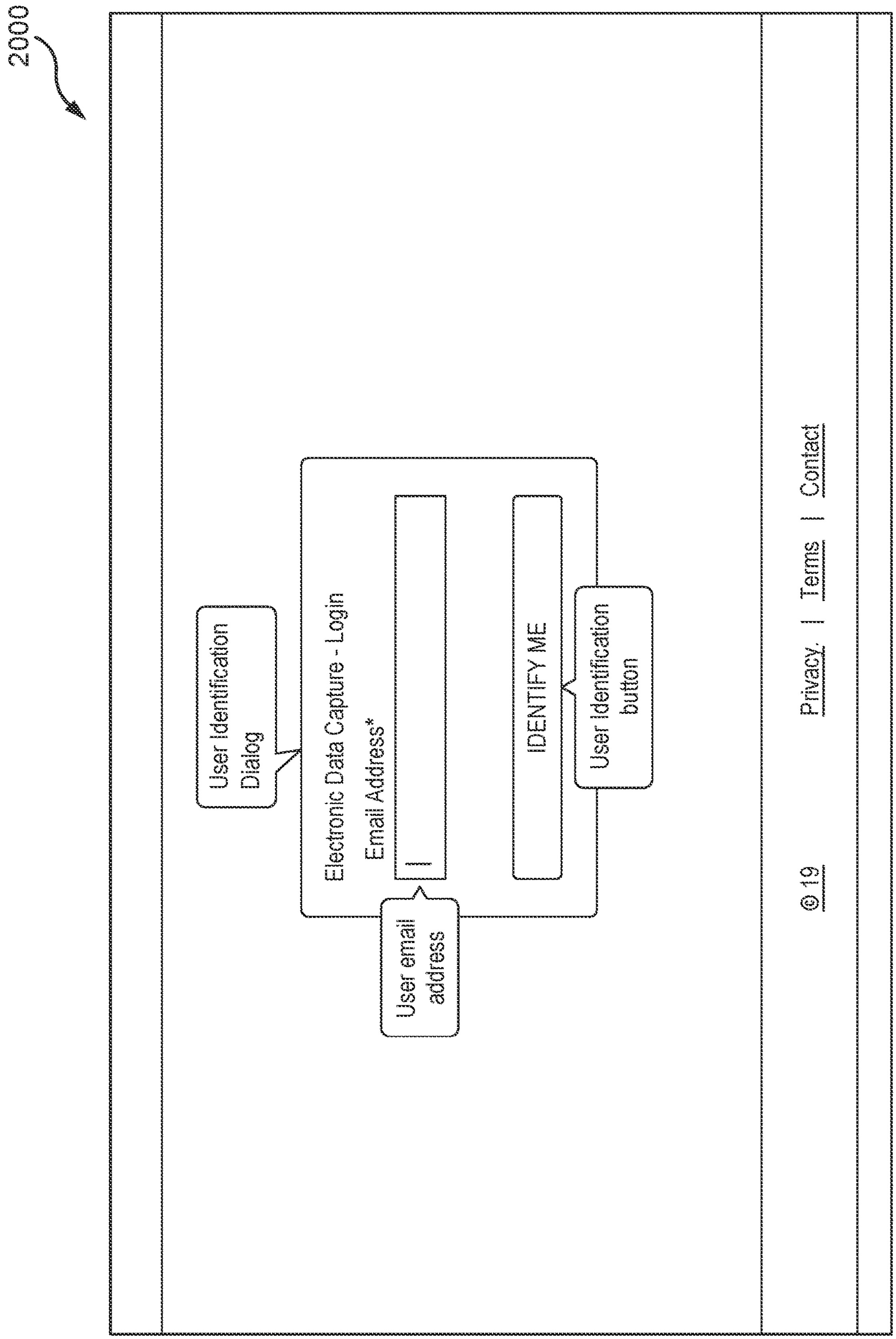
FIGS. 20-30 are images illustrating example user interface screens of a single experiment with the web application of FIG. 5, in accordance with various aspects of the present disclosure.
Figure 21:
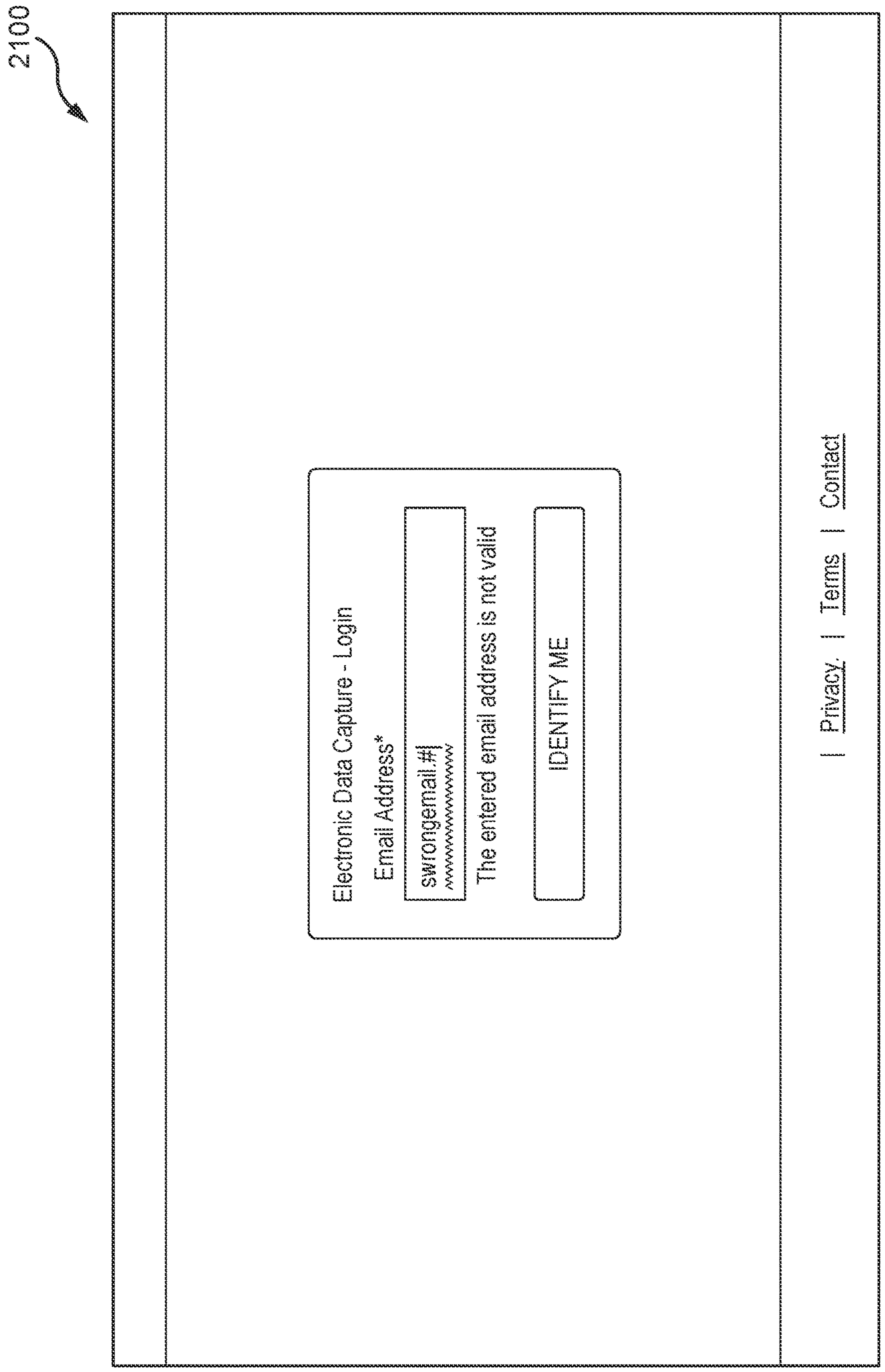
Figure 22:
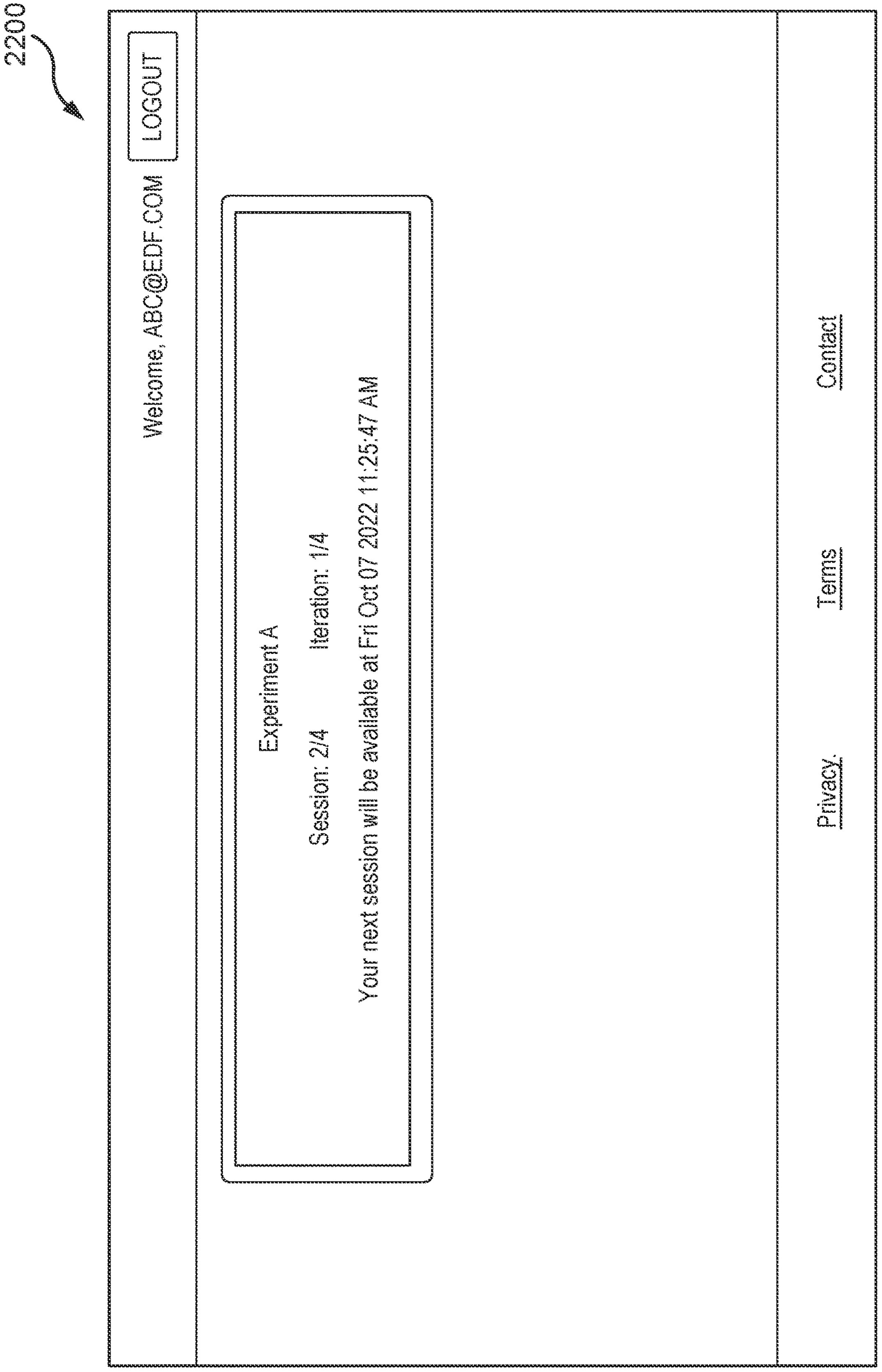
Figure 23:
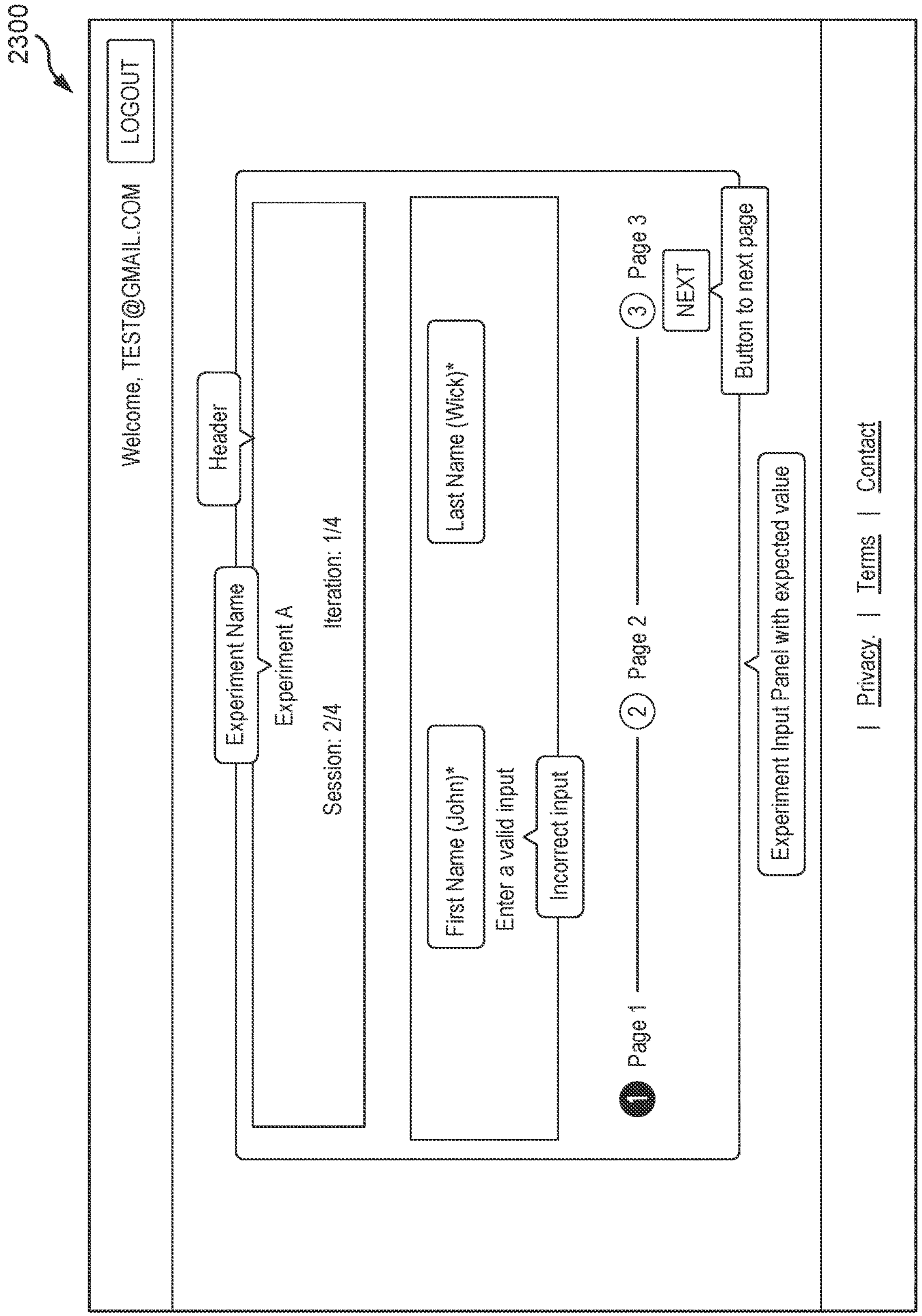
Figure 24:
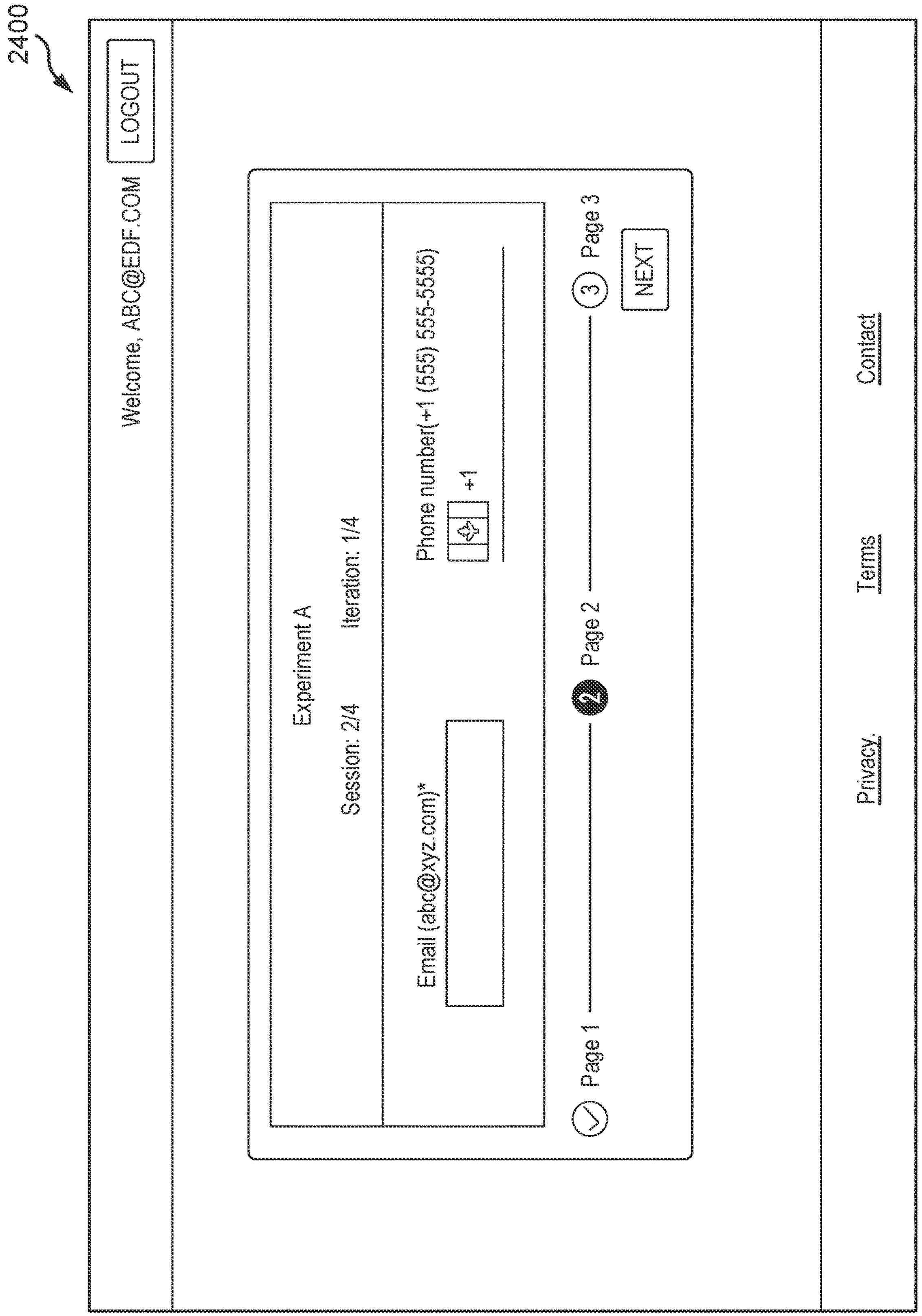
Figure 25:
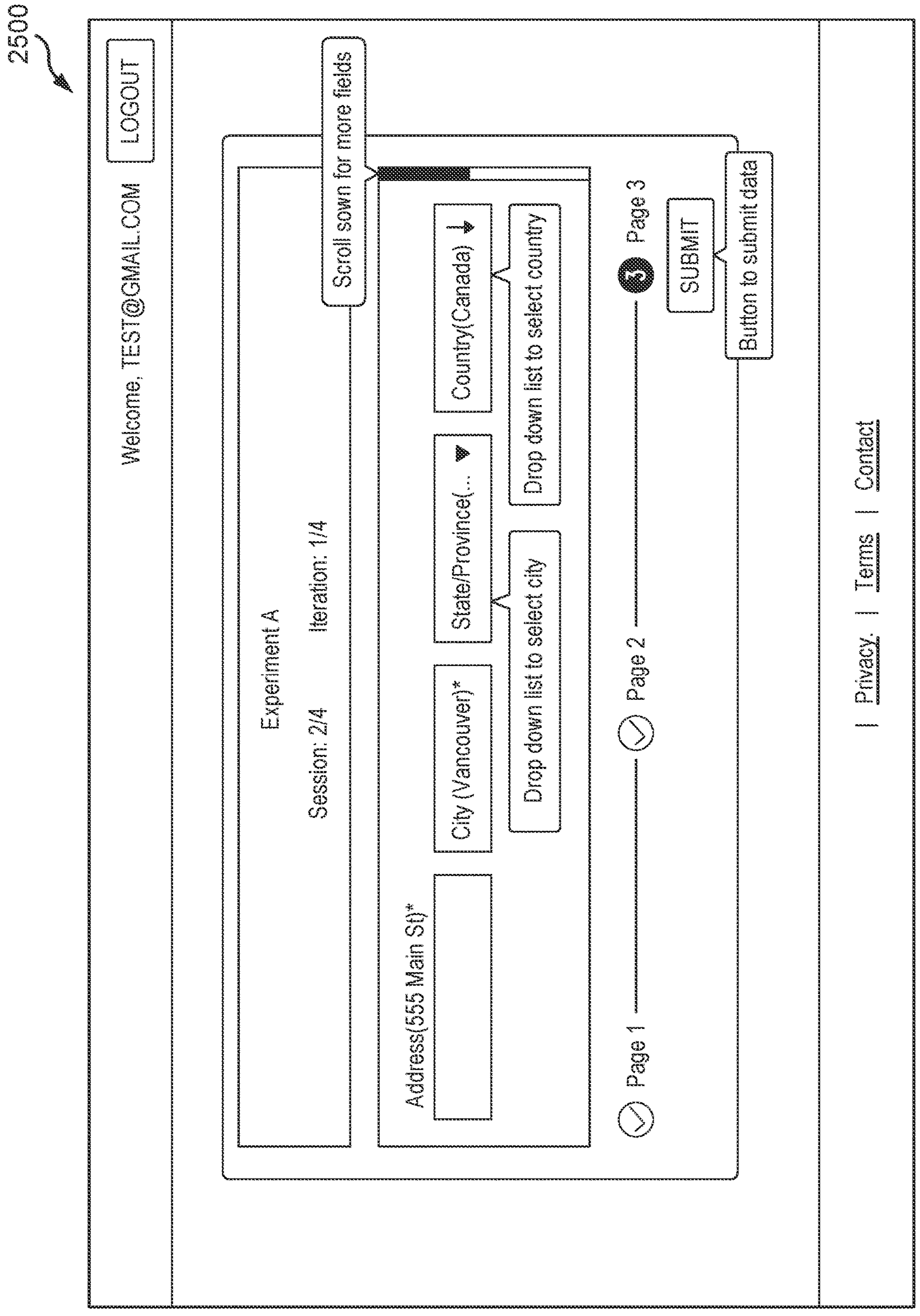
Figure 26:
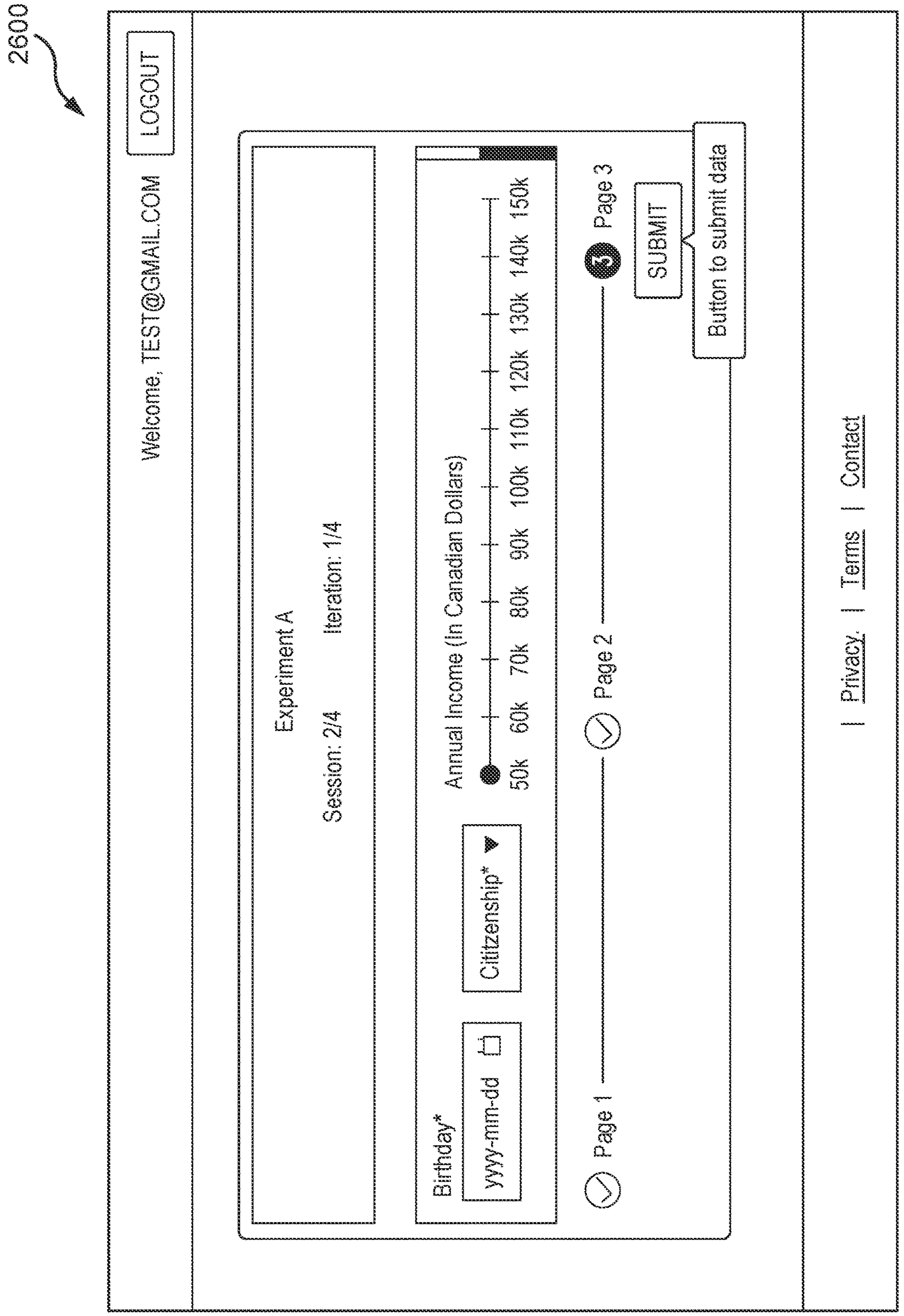
Figure 27:
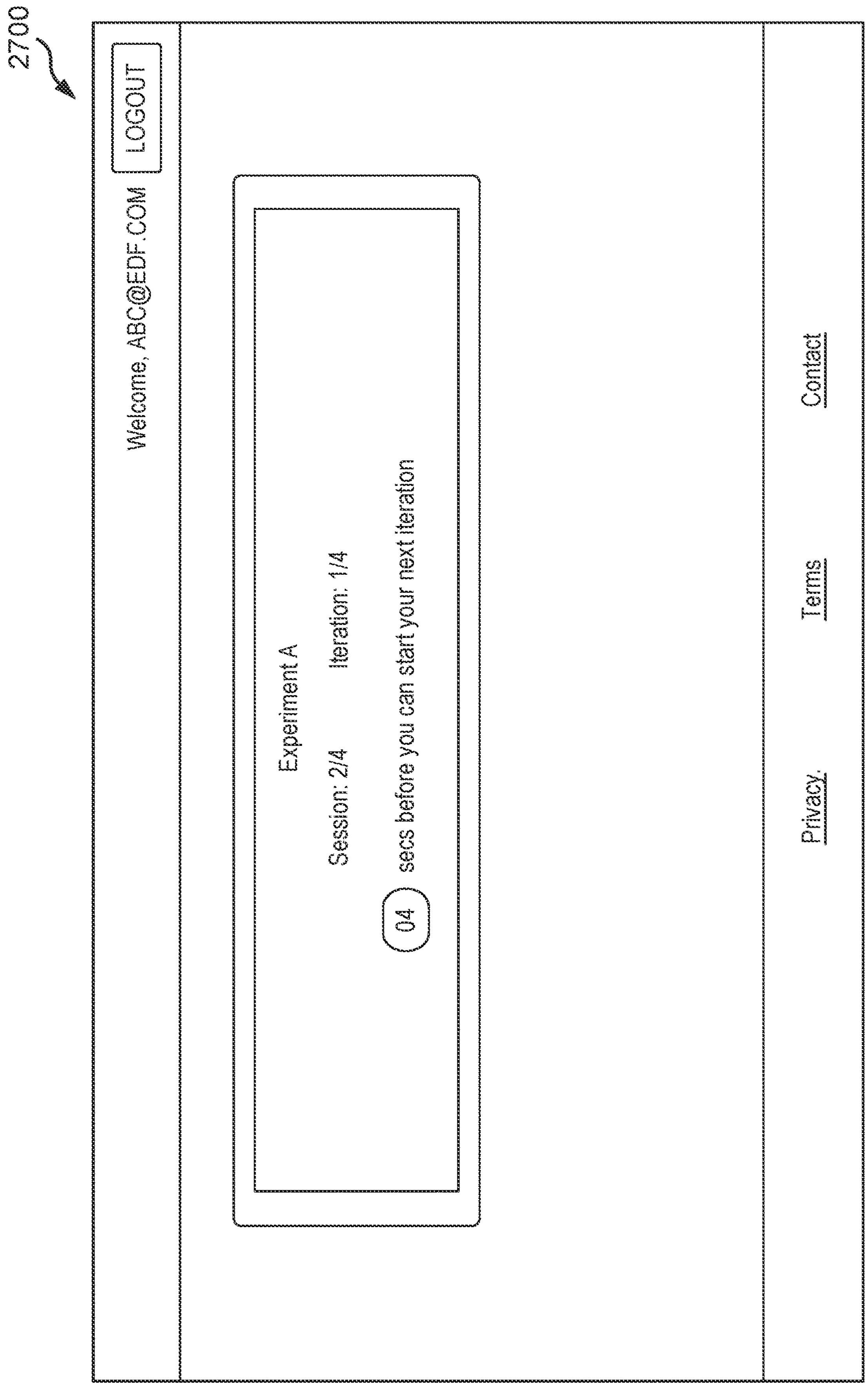
Figure 28:
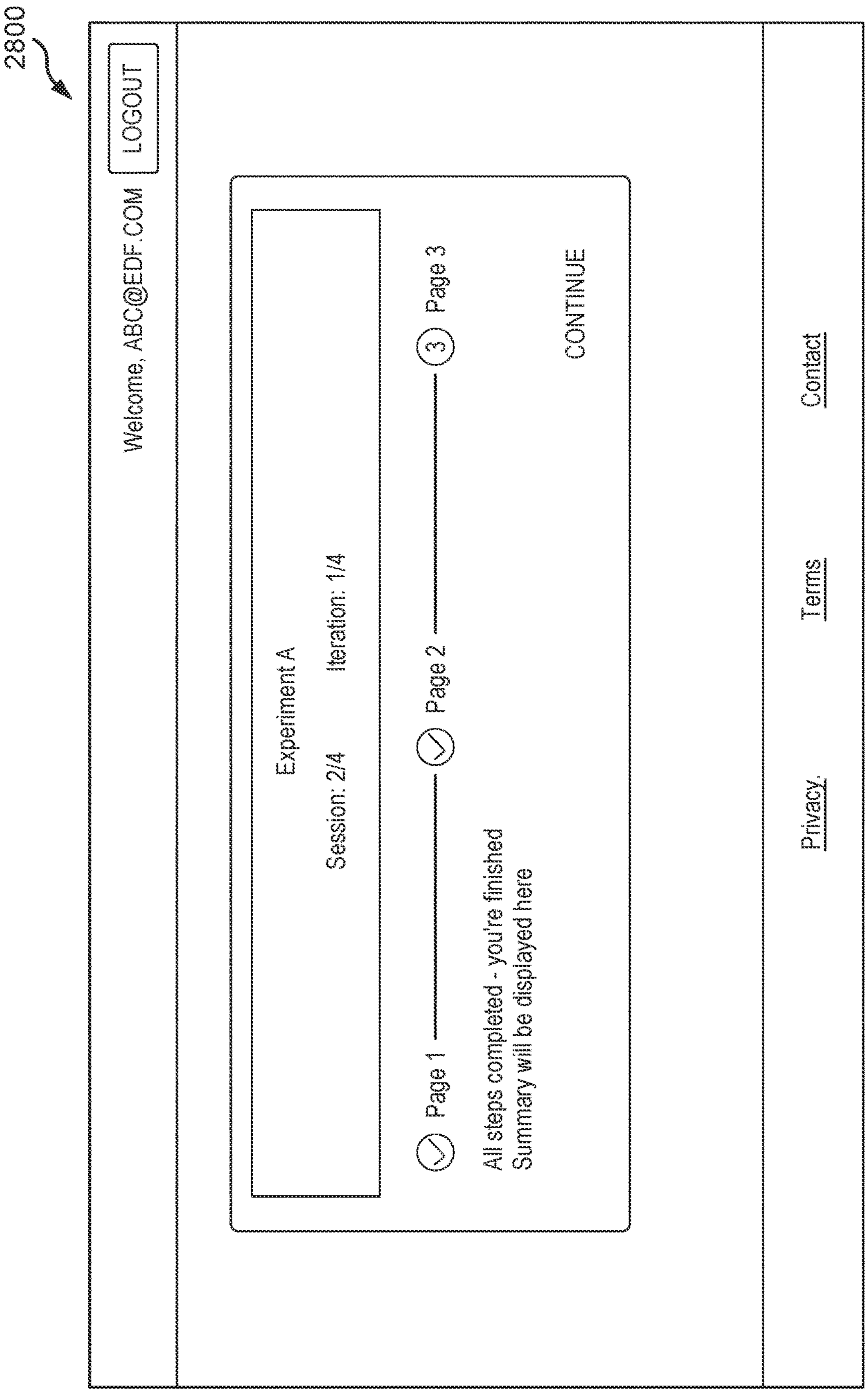
Figure 29:
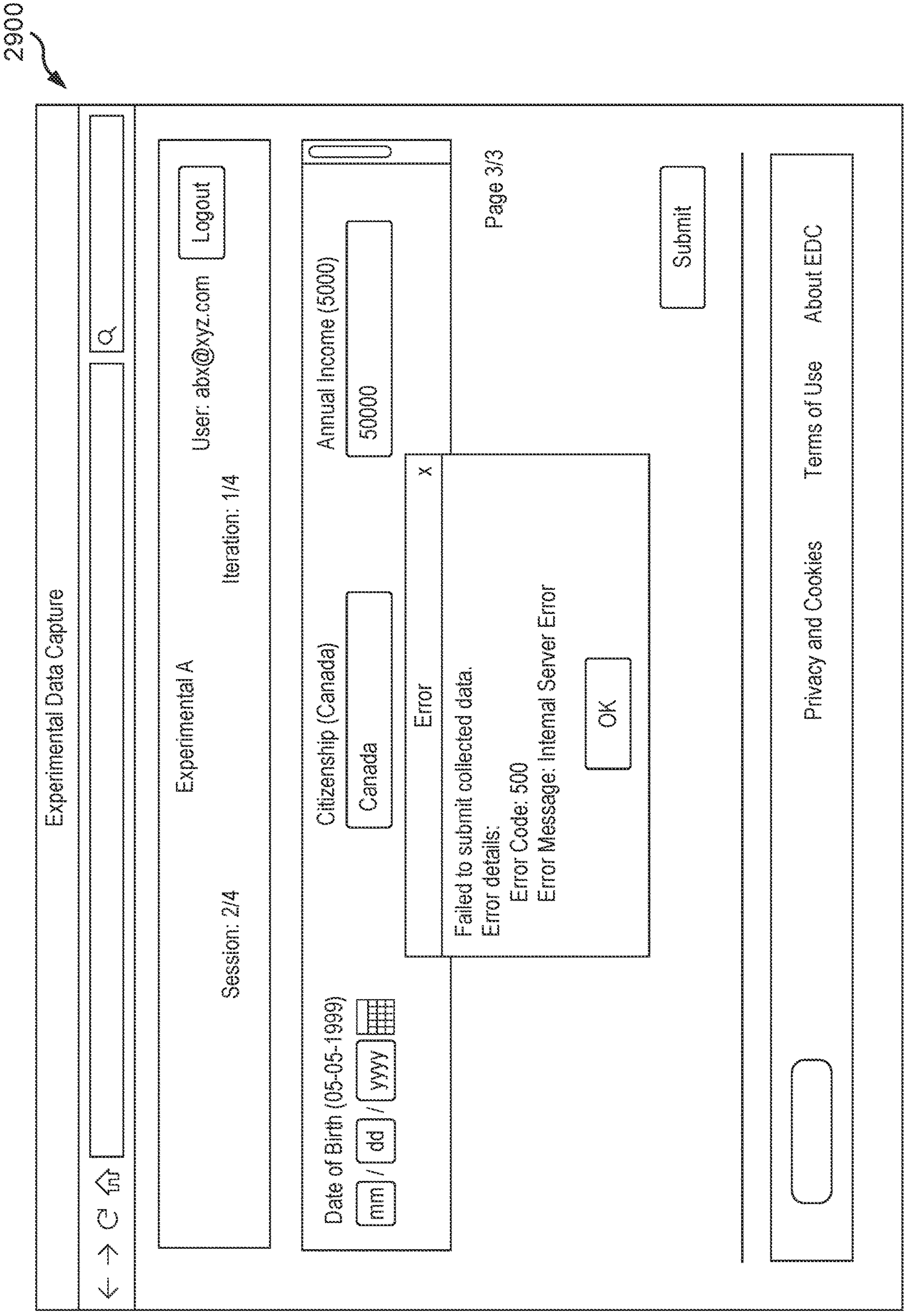
Figure 30:
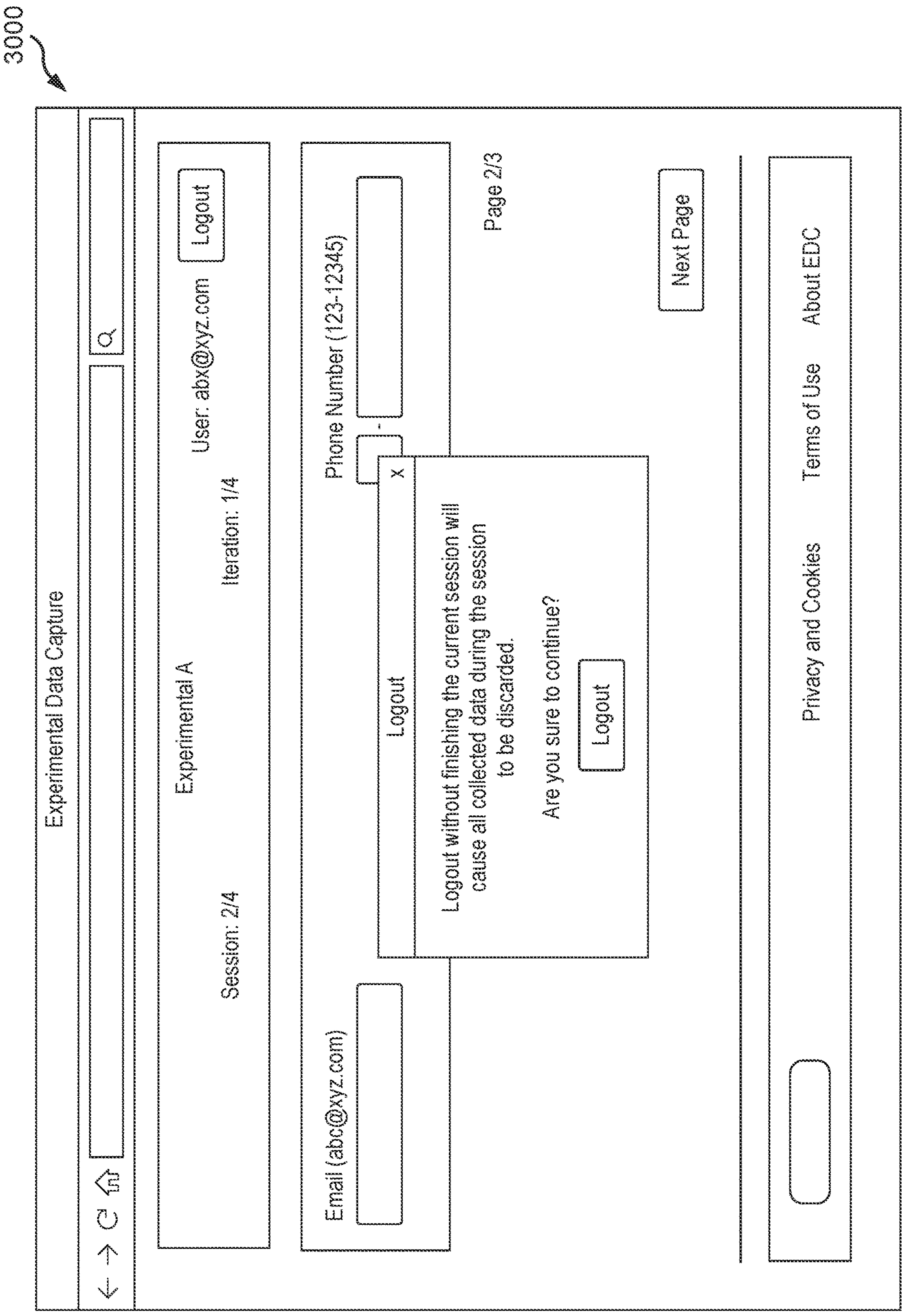

FIGS. 10-18 are images illustrating example user interface screens 1000-1800 of a single experiment with the mobile application 410 of FIG. 5, in accordance with various aspects of the present disclosure. FIG. 19 is an image illustrating an example user interface screen 1900 of a plurality of experiments with the mobile application 410 of FIG. 5, in accordance with various aspects of the present disclosure. FIGS. 20-30 are images illustrating example user interface screens 2000-3000 of a single experiment with the web application 408 of FIG. 5, in accordance with various aspects of the present disclosure. In some examples, the web application 408 of FIG. 5 is similar to the mobile application 410 of FIG. 5.

In addition to the advantages set forth in the Summary, the following are additional advantages of the experimental behavioral data capture platform over a conventional behavioral experiment:

The experimental behavioral data capture platform supports capturing and collecting all available static, persistent data from mobile or desktop devices for each experiment. The experimental behavioral data capture platform supports capturing and collecting all dynamic data from mobile or desktop devices for each experiment (e.g., collect all touch events, collect all mouse events, and collect all sensor events). The experimental behavioral data capture platform is designed in a modular, extensible way, such that the client-side component that collects data has no UI components and enables dynamic plug in (registration/deregistration) of UI components for each experiment. The experimental behavioral data capture platform supports uploading collected data to the data storage component, after the experiment completes.

The experimental behavioral data capture platform enables storing of the data individually per each experiment into a persistent data store. The experimental behavioral data capture platform enables access to stored data for inspection and processing. The experimental behavioral data capture platform provides a mechanism for deleting experiment data when no longer needed. The experimental behavioral data capture platform enables for each experiment: a configuration of which static, persistent and dynamic device attributes are collected, a configuration of the sample frequency used for collecting the dynamic data attributes, specifically sensor event sample frequency, a configuration of the name, text that describes the experiment and the steps required to perform the experiment, a configuration of the required number of iterations for one experiment session, a configuration of the pause interval between two iterations of the same session, a configuration of the pause interval between two sessions of the same experiment (performed by same user), a configuration of minimum number of sessions over a specific period of time, and a configuration of the datasets that will used to perform the experiment.

The experimental behavioral data capture platform supports retrieving and applying the configuration for each experiment before user starts performing the experiment. The experimental behavioral data capture platform supports collecting of the configuration used for each experiment and to minimize the data payload size, only the configuration version is captured in the payload (instead of the full configuration content).

The experimental behavioral data capture platform enables retrieval of all configurations for experiments, specifically, an API server exposes an API method that returns the list of experiments and their configuration.

The experimental behavioral data capture platform provides a mechanism to uniquely identify the user that performs the experiment. Specifically, support for generating and retrieving a user ID for a specific user (e.g. based on user email) and a mechanism to authenticate users that enables provides support for: user sign up (e.g., using email address), user sign in, retrieving user id for signed in user, user removal (after being signed), and user resign up should use same ID. The authentication mechanism may also support SAML and can use different Identity providers. The experimental behavioral data capture platform may support Single Sign On authentication mechanisms and also authorization protocols, for example, OAuth2.

The experimental behavioral data capture platform supports collecting of the information that uniquely identifies the user (e.g., user id) that performs the experiment.

The experimental behavioral data capture platform provides all user interface components required for performing each experiment. Specifically, displays all experiment pages and experiment UI controls within the pages, and displays required field values (from assigned data set) above the corresponding input field, if specified in experiment requirements.

The experimental behavioral data capture platform provides a mechanism to assign experiment datasets to users for each experiment session. Specifically, the experimental behavioral data capture platform provides support for assigning a list of datasets to a user according to experiment specification and independently for each supported platform: web browser and mobile app. The experimental behavioral data capture platform provides support for storing assignments of data sets independently per user and per each supported platform: web browser and mobile app. The experimental behavioral data capture platform provides support for storing assignments of data sets independently per user and per each supported platform: web browser and mobile app. The data sets are part of the configuration file. Each experiment has its own configuration file, which is also stored independently for each experiment.

The experimental behavioral data capture platform supports collecting of the experiment data set used by user when performing the experiment. The experimental behavioral data capture platform enables visualization and management of the experiment list and associated configurations. The experimental behavioral data capture platform performs validation of experiment configuration before saving configuration. The experimental behavioral data capture platform components are designed in a generic, cloud agnostic way, if possible, or multi-cloud enabled. Server side components can interact with or use internally cloud specific components (e.g. a "cloud storage" library can be used to interact with AWS S3, or the Azure Blob). The experimental behavioral data capture platform supports both internal and external experiments.

The experimental behavioral data capture platform supports performing experiments that include multiple step flows: 1) experiments that have multiple UI pages/views, specified navigation mechanism between UI pages (e.g.: swipe, click, etc.).

The experimental behavioral data capture platform supports performing multi step collection and upload of data for same experiment: a collected experiment payload includes experiment identifier, and a collected experiment payload includes placement information (e.g., page in which the payload was collected).

The experimental behavioral data capture platform provides a mechanism that ensures only authorized users have access to collected data (managing the list of authorized users and managing the access level for each user).

The following are a set of enumerated examples of the devices, non-transitory computer-readable media, and systems described herein. Example 1: a computing device comprising: a memory; and an electronic processor configured to: receive information of a user of the computing device, perform authentication of the user based on the information of the user, determine a list of behavioral experiments that can be performed by the user based on the authentication of the user and the information of the user, the list of behavioral experiments including one or more behavioral experiments, display the list of behavioral experiments, receive a selection of a behavioral experiment in the list of behavioral experiments from the user, initiate the behavioral experiment based on the selection, and in response to the user completing the behavioral experiment, upload experiment data to a server.

Example 2: the computing device of Example 1, wherein the electronic processor is further configured to: calculate an amount of time from a last execution of a previous session of the behavioral experiment by the user, determine whether the amount of time is greater than or equal to a session wait time threshold, and responsive to determining that the amount of time is not greater than or equal to the session wait time threshold, control a display screen to display a timer with remaining time until next session of the behavioral experiment is available based on the amount of time that is calculated.

Example 3: the computing device of Example 2, wherein the electronic processor is further configured to: responsive to determining that the amount of time is greater than or equal to the session wait time threshold, display the next session of the behavioral experiment as available for selection, receive a second selection of the next session of the behavioral experiment from the user, initiate the next session of the behavioral experiment based on the second selection, and in response to the user completing the next session of the behavioral experiment, upload additional experiment data to the server.

Example 4: the computing device of any of Examples 1-3, wherein the electronic processor is further configured to: calculate an amount of time from a last execution of a previous behavioral experiment by the user, determine whether the amount of time is greater than or equal to an experiment wait time threshold, and responsive to determining that the amount of time is not greater than or equal to the experiment wait time threshold, control a display screen to display a timer with remaining time until next behavioral experiment is available based on the amount of time that is calculated.

Example 5: the computing device of Example 4, wherein the electronic processor is further configured to: responsive to determining that the amount of time is greater than or equal to the experiment wait time threshold, control the display screen to display an updated list of behavioral experiments, receive a second selection of a second behavioral experiment in the updated list of behavioral experiments from the user, initiate the second behavioral experiment based on the second selection, and in response to the user completing the second behavioral experiment, upload second experiment data to the server.

Example 6: the computing device of Example 4, wherein the experiment wait time threshold is a configured interval that is the same between each behavioral experiment in the list of behavioral experiments.

Example 7: the computing device of Example 5, wherein the experiment wait time threshold is a configured interval between the behavioral experiment and a second behavioral experiment in the list of behavioral experiments, wherein a second experiment wait time threshold is a second configured interval between the behavioral experiment and a third behavioral experiment in the list of behavioral experiments, wherein the second behavioral experiment is distinct from the behavioral experiment and the third behavioral experiment, and wherein the third behavioral experiment is distinct from the behavioral experiment and the second behavioral experiment.

Example 8: the computing device of any of Examples 1-7, wherein the experiment data includes a collected behavioral data payload and some or all of a timestamp, an experiment identifier (ID), an identification of a dataset used in the behavioral experiment, an identification of a configuration used in the behavioral experiment, a session number, an iteration number, an identification of a channel, and an identification of a platform.

Example 9: a non-transitory computer-readable medium comprising instructions that, when executed by an electronic processor, cause the electronic processor to perform a set of operations comprising: receiving information of a user; performing authentication of the user based on the information of the user; determining a list of behavioral experiments that can be performed by the user based on the authentication of the user and the information of the user, the list of behavioral experiments including one or more behavioral experiments; controlling a display to display the list of behavioral experiments; receiving a selection of a behavioral experiment in the list of behavioral experiments from the user; initiating the behavioral experiment based on the selection; and in response to the user completing the behavioral experiment, uploading experiment data to a server.

Example 10: the non-transitory computer-readable medium of Example 9, wherein the electronic processor is further configured to: calculate an amount of time from a last execution of a previous session of the behavioral experiment by the user, determine whether the amount of time is greater than or equal to a session wait time threshold, and responsive to determining that the amount of time is not greater than or equal to the session wait time threshold, control a display screen to display a timer with remaining time until next session of the behavioral experiment is available based on the amount of time that is calculated.

Example 11: the non-transitory computer-readable medium of Example 10, wherein the electronic processor is further configured to: responsive to determining that the amount of time is greater than or equal to the session wait time threshold, display the next session of the behavioral experiment as available for selection, receive a second selection of the next session of the behavioral experiment from the user, initiate the next session of the behavioral experiment based on the second selection, and in response to the user completing the next session of the behavioral experiment, upload additional experiment data to the server.

Example 12: the non-transitory computer-readable medium of any of Examples 9-11, wherein the electronic processor is further configured to: calculate an amount of time from a last execution of a previous behavioral experiment by the user, determine whether the amount of time is greater than or equal to an experiment wait time threshold, and responsive to determining that the amount of time is not greater than or equal to the experiment wait time threshold, control a display screen to display a timer with remaining time until next behavioral experiment is available based on the amount of time that is calculated.

Example 13: the non-transitory computer-readable medium of Example 12, wherein the electronic processor is further configured to: responsive to determining that the amount of time is greater than or equal to the experiment wait time threshold, control the display screen to display an updated list of behavioral experiments, receive a second selection of a second behavioral experiment in the updated list of behavioral experiments from the user, initiate the second behavioral experiment based on the second selection, and in response to the user completing the second behavioral experiment, upload second experiment data to the server.

Example 14: the non-transitory computer-readable medium of Example 12, wherein the experiment wait time threshold is a configured interval that is the same between each behavioral experiment in the list of behavioral experiments.

Example 15: the non-transitory computer-readable medium of Example 14, wherein the experiment wait time threshold is a configured interval between the behavioral experiment and a second behavioral experiment in the list of behavioral experiments, wherein a second experiment wait time threshold is a second configured interval between the behavioral experiment and a third behavioral experiment in the list of behavioral experiments, wherein the second behavioral experiment is distinct from the behavioral experiment and the third behavioral experiment, and wherein the third behavioral experiment is distinct from the behavioral experiment and the second behavioral experiment.

Example 16: the non-transitory computer-readable medium of any of Examples 9-15, wherein the experiment data includes a collected behavioral data payload and some or all of a timestamp, an experiment identifier (ID), an identification of a dataset used in the behavioral experiment, an identification of a configuration used in the behavioral experiment, a session number, an iteration number, an identification of a channel, and an identification of a platform.

Example 17: a system comprising: a computing device; and a server including a memory and an electronic processor, the memory including a list of behavioral experiments, and the electronic processor is configured to: receive information of a user of the computing device, perform authentication of the user based on the information of the user, receive a request for access to a portion of the list of behavioral experiments that can be performed by the user based on the authentication of the user and the information of the user, the portion of the list of behavioral experiments including one or more behavioral experiments, output the portion of the list of behavioral experiments to the computing device, receive experiment data from the computing device, the experiment data including a collected behavioral data payload, and the experiment data indicating an association with a behavioral experiment from the portion of the list of behavioral experiments, store the experiment data in the memory, and associate the experiment data with the behavioral experiment from the list of behavioral experiments.

Example 18: the system of Example 17, wherein the computing device includes a second memory and a second electronic processor, the second electronic processor is configured to: receive the information of the user of the computing device, request the authentication of the user by the server, request access to the portion of the list of behavioral experiments that can be performed by the user based on the authentication of the user and the information of the user, display the portion of the list of behavioral experiments, receive a selection of the behavioral experiment in the portion of the list of behavioral experiments from the user, initiate the behavioral experiment based on the selection, and in response to the user completing the behavioral experiment, upload the experiment data to the server.

Example 19: the system of any of Examples 17 and 18, wherein the electronic processor is further configured to: receive second experiment data from the computing device, the second experiment data including a second collected behavioral data payload, and the second experiment data indicating an association with a second session of the behavioral experiment from the portion of the list of behavioral experiments, wherein the second experiment data is distinct from the experiment data, wherein the second experiment data is distinct from the experiment data, store the second experiment data in the memory, and associate the second experiment data with the behavioral experiment from the list of behavioral experiments.

Example 20: the system of any of Examples 17-19, wherein the electronic processor is further configured to: receive second experiment data from the computing device, the second experiment data including a second collected behavioral data payload, and the second experiment data indicating an association with a second behavioral experiment from the portion of the list of behavioral experiments, wherein the second behavioral experiment is distinct from the behavioral experiment, wherein the second behavioral experiment is distinct from the behavioral experiment, store the second experiment data in the memory, and associate the second experiment data with the second behavioral experiment from the list of behavioral experiments.

The foregoing description is merely illustrative in nature and does not limit the scope of the disclosure or its applications. The broad teachings of the disclosure may be implemented in many different ways. While the disclosure includes some particular examples, other modifications will become apparent upon a study of the drawings, the text of this specification, and the following claims. In the written description and the claims, one or more processes within any given method may be executed in a different order—or processes may be executed concurrently or in combination with each other—without altering the principles of this disclosure. Similarly, instructions stored in a non-transitory computer-readable medium may be executed in a different order—or concurrently—without altering the principles of this disclosure. Unless otherwise indicated, the numbering or other labeling of instructions or method steps is done for convenient reference and does not necessarily indicate a fixed sequencing or ordering.

Unless the context of their usage unambiguously indicates otherwise, the articles "a," "an," and "the" should not be interpreted to mean "only one." Rather, these articles should be interpreted to mean "at least one" or "one or more." Likewise, when the terms "the" or "said" are used to refer to a noun previously introduced by the indefinite article "a" or "an," the terms "the" or "said" should similarly be interpreted to mean "at least one" or "one or more" unless the context of their usage unambiguously indicates otherwise.

Spatial and functional relationships between elements—such as modules—are described using terms such as (but not limited to) "connected," "engaged," "interfaced," and/or "coupled." Unless explicitly described as being "direct," relationships between elements may be direct or include intervening elements. The phrase "at least one of A, B, and C" should be construed to indicate a logical relationship (A OR B OR C), where OR is a non-exclusive logical OR, and should not be construed to mean "at least one of A, at least one of B, and at least one of C." The term "set" does not necessarily exclude the empty set. For example, the term "set" may have zero elements. The term "subset" does not necessarily require a proper subset. For example, a "subset" of set A may be coextensive with set A, or include elements of set A. Furthermore, the term "subset" does not necessarily exclude the empty set.

In the figures, the directions of arrows generally demonstrate the flow of information—such as data or instructions. The direction of an arrow does not imply that information is not being transmitted in the reverse direction. For example, when information is sent from a first element to a second element, the arrow may point from the first element to the second element. However, the second element may send requests for data to the first element, and/or acknowledgements of receipt of information to the first element. Furthermore, while the figures illustrate a number of components and/or steps, any one or more of the components and/or steps may be omitted or duplicated, as suitable for the application and setting.

The term "computer-readable medium" does not encompass transitory electrical or electromagnetic signals or electromagnetic signals propagating through a medium—such as on an electromagnetic carrier wave. The term "computer-readable medium" is considered tangible and non-transitory. The functional blocks, flowchart elements, and message sequence charts described above serve as software specifications that may be translated into computer programs by the routine work of a skilled technician or programmer.

It should also be understood that although certain drawings illustrate hardware and software as being located within particular devices, these depictions are for illustrative purposes only. In some embodiments, the illustrated components may be combined or divided into separate software, firmware, and/or hardware. For example, instead of being located within and performed by a single electronic processor, logic and processing may be distributed among multiple electronic processors. Regardless of how they are combined or divided, hardware and software components may be located on the same computing device, or they may be distributed among different computing devices—such as computing devices interconnected by one or more networks or other communications systems.

In the claims, if an apparatus or system is claimed as including an electronic processor or other element configured in a certain manner, the claim or claimed element should be interpreted as meaning one or more electronic processors (or other element as appropriate). If the electronic processor (or other element) is described as being configured to make one or more determinations or one or execute one or more steps, the claim should be interpreted to mean that any combination of the one or more electronic processors (or any combination of the one or more other elements) may be configured to execute any combination of the one or more determinations (or one or more steps).

Thus, the present disclosure provides, among other things, devices, non-transitory computer-readable media, and systems for an experimental behavioral data capture platform. Various features and advantages of the invention are set forth in the following claims.

What is claimed is:

1. A computing device comprising:

a memory; and an electronic processor configured to:

receive information of a user of the computing device, perform authentication of the user based on the information of the user, determine a list of behavioral experiments that can be performed by the user based on the authentication of the user and the information of the user, the list of behavioral experiments including one or more behavioral experiments, display the list of behavioral experiments, receive a selection of a behavioral experiment in the list of behavioral experiments from the user, execute the behavioral experiment based on the selection, display, on a display screen of the computing device, a behavioral experiment page of the behavioral experiment and register one or more listeners that track interactions of the user with the computing device while the behavioral experiment is executed to capture inputs of the user, and in response to the user completing the behavioral experiment, upload experiment data including the selected behavioral experiment and the captured inputs of the user from the one or more listeners to a server.

2. The computing device of claim 1, wherein the electronic processor is further configured to:

calculate an amount of time from a last execution of a previous session of the behavioral experiment by the user, determine whether the amount of time is greater than or equal to a session wait time threshold, and responsive to determining that the amount of time is not greater than or equal to the session wait time threshold, control a display screen to display a timer with remaining time until next session of the behavioral experiment is available based on the amount of time that is calculated.

3. The computing device of claim 2, wherein the electronic processor is further configured to:

responsive to determining that the amount of time is greater than or equal to the session wait time threshold, display the next session of the behavioral experiment as available for selection, receive a second selection of the next session of the behavioral experiment from the user, initiate the next session of the behavioral experiment based on the second selection, and in response to the user completing the next session of the behavioral experiment, upload additional experiment data to the server.

4. The computing device of claim 1, wherein the electronic processor is further configured to:

calculate an amount of time from a last execution of a previous behavioral experiment by the user, determine whether the amount of time is greater than or equal to an experiment wait time threshold, and responsive to determining that the amount of time is not greater than or equal to the experiment wait time threshold, control a display screen to display a timer with remaining time until next behavioral experiment is available based on the amount of time that is calculated.

5. The computing device of claim 4, wherein the electronic processor is further configured to:

responsive to determining that the amount of time is greater than or equal to the experiment wait time threshold, control the display screen to display an updated list of behavioral experiments, receive a second selection of a second behavioral experiment in the updated list of behavioral experiments from the user, initiate the second behavioral experiment based on the second selection, and in response to the user completing the second behavioral experiment, upload second experiment data to the server.

6. The computing device of claim 4, wherein the experiment wait time threshold is a configured interval that is the same between each behavioral experiment in the list of behavioral experiments.

7. The computing device of claim 5, wherein the experiment wait time threshold is a configured interval between the behavioral experiment and a second behavioral experiment in the list of behavioral experiments, wherein a second experiment wait time threshold is a second configured interval between the behavioral experiment and a third behavioral experiment in the list of behavioral experiments, wherein the second behavioral experiment is distinct from the behavioral experiment and the third behavioral experiment, and wherein the third behavioral experiment is distinct from the behavioral experiment and the second behavioral experiment.

8. The computing device of claim 1, wherein, to perform authentication of the user based on the information of the user, the electronic processor is further configured to perform an authentication mechanism on the information of the user that uniquely identifies the user, wherein the authentication mechanism includes a Single Sign On authentication mechanism and an OAuth2 authentication protocol, and wherein the experiment data includes a collected behavioral data payload and some or all of a timestamp, an experiment identifier (ID), an identification of a dataset used in the behavioral experiment, an identification of a configuration used in the behavioral experiment, a session number, an iteration number, an identification of a channel, and an identification of a platform.

9. A non-transitory computer-readable medium comprising instructions that, when executed by an electronic processor, cause the electronic processor to perform a set of operations comprising:

receiving information of a user;

performing authentication of the user based on the information of the user;

determining a list of behavioral experiments that can be performed by the user based on the authentication of the user and the information of the user, the list of behavioral experiments including one or more behavioral experiments;

controlling a display to display the list of behavioral experiments;

receiving a selection of a behavioral experiment in the list of behavioral experiments from the user;

executing the behavioral experiment based on the selection; and displaying, on a display screen of a computing device, a behavioral experiment page of the behavioral experiment and registering one or more listeners that track interactions of the user with the computing device while the behavioral experiment is executed to capture inputs of the user; and in response to the user completing the behavioral experiment, uploading experiment data including the selected behavioral experiment and the captured inputs of the user from the one or more listeners to a server.

10. The non-transitory computer-readable medium of claim 9, wherein the electronic processor is further configured to:

calculate an amount of time from a last execution of a previous session of the behavioral experiment by the user, determine whether the amount of time is greater than or equal to a session wait time threshold, and responsive to determining that the amount of time is not greater than or equal to the session wait time threshold, control a display screen to display a timer with remaining time until next session of the behavioral experiment is available based on the amount of time that is calculated.

11. The non-transitory computer-readable medium of claim 10, wherein the electronic processor is further configured to:

responsive to determining that the amount of time is greater than or equal to the session wait time threshold, display the next session of the behavioral experiment as available for selection, receive a second selection of the next session of the behavioral experiment from the user, initiate the next session of the behavioral experiment based on the second selection, and in response to the user completing the next session of the behavioral experiment, upload additional experiment data to the server.

12. The non-transitory computer-readable medium of claim 9, wherein the electronic processor is further configured to:

calculate an amount of time from a last execution of a previous behavioral experiment by the user, determine whether the amount of time is greater than or equal to an experiment wait time threshold, and responsive to determining that the amount of time is not greater than or equal to the experiment wait time threshold, control a display screen to display a timer with remaining time until next behavioral experiment is available based on the amount of time that is calculated.

13. The non-transitory computer-readable medium of claim 12, wherein the electronic processor is further configured to:

responsive to determining that the amount of time is greater than or equal to the experiment wait time threshold, control the display screen to display an updated list of behavioral experiments, receive a second selection of a second behavioral experiment in the updated list of behavioral experiments from the user, initiate the second behavioral experiment based on the second selection, and in response to the user completing the second behavioral experiment, upload second experiment data to the server.

14. The non-transitory computer-readable medium of claim 12, wherein the experiment wait time threshold is a configured interval that is the same between each behavioral experiment in the list of behavioral experiments.

15. The non-transitory computer-readable medium of claim 14, wherein the experiment wait time threshold is a configured interval between the behavioral experiment and a second behavioral experiment in the list of behavioral experiments, wherein a second experiment wait time threshold is a second configured interval between the behavioral experiment and a third behavioral experiment in the list of behavioral experiments, wherein the second behavioral experiment is distinct from the behavioral experiment and the third behavioral experiment, and wherein the third behavioral experiment is distinct from the behavioral experiment and the second behavioral experiment.

16. The non-transitory computer-readable medium of claim 9, wherein performing the authentication of the user based on the information of the user further includes performing an authentication mechanism on the information of the user that uniquely identifies the user, wherein the authentication mechanism includes a Single Sign On authentication mechanism and an OAuth2 authentication protocol, and wherein the experiment data includes a collected behavioral data payload and some or all of a timestamp, an experiment identifier (ID), an identification of a dataset used in the behavioral experiment, an identification of a configuration used in the behavioral experiment, a session number, an iteration number, an identification of a channel, and an identification of a platform.

17. A system comprising:

a computing device; and a server including a memory and an electronic processor, the memory including a list of behavioral experiments, and the electronic processor is configured to:

receive information of a user of the computing device, perform authentication of the user based on the information of the user, receive a request for access to a portion of the list of behavioral experiments that can be performed by the user based on the authentication of the user and the information of the user, the portion of the list of behavioral experiments including one or more behavioral experiments, output the portion of the list of behavioral experiments to the computing device, receive experiment data from the computing device, the experiment data including a selected behavioral experiment from the list of behavioral experiments and a collected behavioral data payload that includes captured inputs of the user from one or more listeners registered by the computing device to track interactions of the user with the computing device while the selected behavioral experiment was executed, store the experiment data in the memory, and associate the experiment data with the behavioral experiment from the list of behavioral experiments.

18. The system of claim 17, wherein the computing device includes a second memory and a second electronic processor, the second electronic processor is configured to:

receive the information of the user of the computing device, request the authentication of the user by the server, request access to the portion of the list of behavioral experiments that can be performed by the user based on the authentication of the user and the information of the user, display the portion of the list of behavioral experiments, receive a selection of the behavioral experiment in the portion of the list of behavioral experiments from the user, initiate the behavioral experiment based on the selection, and in response to the user completing the behavioral experiment, upload the experiment data to the server.

19. The system of claim 17, wherein the electronic processor is further configured to:

receive second experiment data from the computing device, the second experiment data including a second collected behavioral data payload, and the second experiment data indicating an association with a second session of the behavioral experiment from the portion of the list of behavioral experiments, wherein the second experiment data is distinct from the experiment data, store the second experiment data in the memory, and associate the second experiment data with the behavioral experiment from the list of behavioral experiments.

20. The system of claim 17, wherein the electronic processor is further configured to:

receive second experiment data from the computing device, the second experiment data including a second collected behavioral data payload, and the second experiment data indicating an association with a second behavioral experiment from the portion of the list of behavioral experiments, wherein the second behavioral experiment is distinct from the behavioral experiment, store the second experiment data in the memory, and associate the second experiment data with the second behavioral experiment from the list of behavioral experiments.

* * * * *